(12) United States Patent
Mizuno et al.

(10) Patent No.: US 7,215,873 B2
(45) Date of Patent: May 8, 2007

(54) IMAGE RECORDING AND REPLAYING APPARATUS, METHOD, PROGRAM, AND COMPUTER-READABLE RECORDING MEDIUM RECORDING THE PROGRAM

(75) Inventors: Toshio Mizuno, Nagoya (JP); Tsutomu Kumazaki, Kakamigahara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1227 days.

(21) Appl. No.: 10/219,234

(22) Filed: Aug. 15, 2002

(65) Prior Publication Data

US 2003/0039466 A1 Feb. 27, 2003

(30) Foreign Application Priority Data

Aug. 24, 2001 (JP) ............................. 2001-255101
Jun. 14, 2002 (JP) ............................. 2002-174925

(51) Int. Cl.
*H04N 5/91* (2006.01)
(52) U.S. Cl. ........................................ 386/68; 386/125
(58) Field of Classification Search ................ 386/6–8, 386/45, 46, 68, 70, 109, 125, 126
See application file for complete search history.

(56) References Cited

U.S. PATENT DOCUMENTS 4,195,317 A * 3/1980 Stratton ....................... 386/69
5,555,463 A 9/1996 Staron 6,408,128 B1 * 6/2002 Abecassis ..................... 386/68
6,424,790 B1 * 7/2002 Ishii et al. .................... 386/69
6,847,781 B1 * 1/2005 Sugimura et al. ............. 386/68
6,987,924 B1 * 1/2006 Fujita et al. ................... 386/46
2002/0057891 A1 5/2002 Shigaki

FOREIGN PATENT DOCUMENTS

| EP | 0 279 549 A2 | 8/1988 |
| EP | 1 213 927 A2 | 12/2002 |
| JP | 7212713 | 8/1995 |
| JP | 8102905 | 4/1996 |
| WO | WO 96/20566 | 7/1996 |
| WO | WO 00/60820 | 10/2000 |

* cited by examiner

*Primary Examiner*—James J. Groody
*Assistant Examiner*—Christopher Onuaku

(57) ABSTRACT

An image recording and replaying apparatus in which a repeat recording control unit receives specification of a repeat recording time period, and instructs an image data recording unit to record image data; the image data recording unit records the image data into files having capacity corresponding to a predetermined time period; a replay control mode setting unit, under control of the repeat recording control unit, sets an all-replays-available mode for files recorded within the specified repeat recording time period back from the current time, and sets a replay restriction mode for a file that was recorded in the predetermined time period immediately before the repeat recording time period; and a replay control mode judging unit outputs a warning that special replays other than fast forward are not available if it judges that a currently replayed file is set to the replay restriction mode.

23 Claims, 17 Drawing Sheets

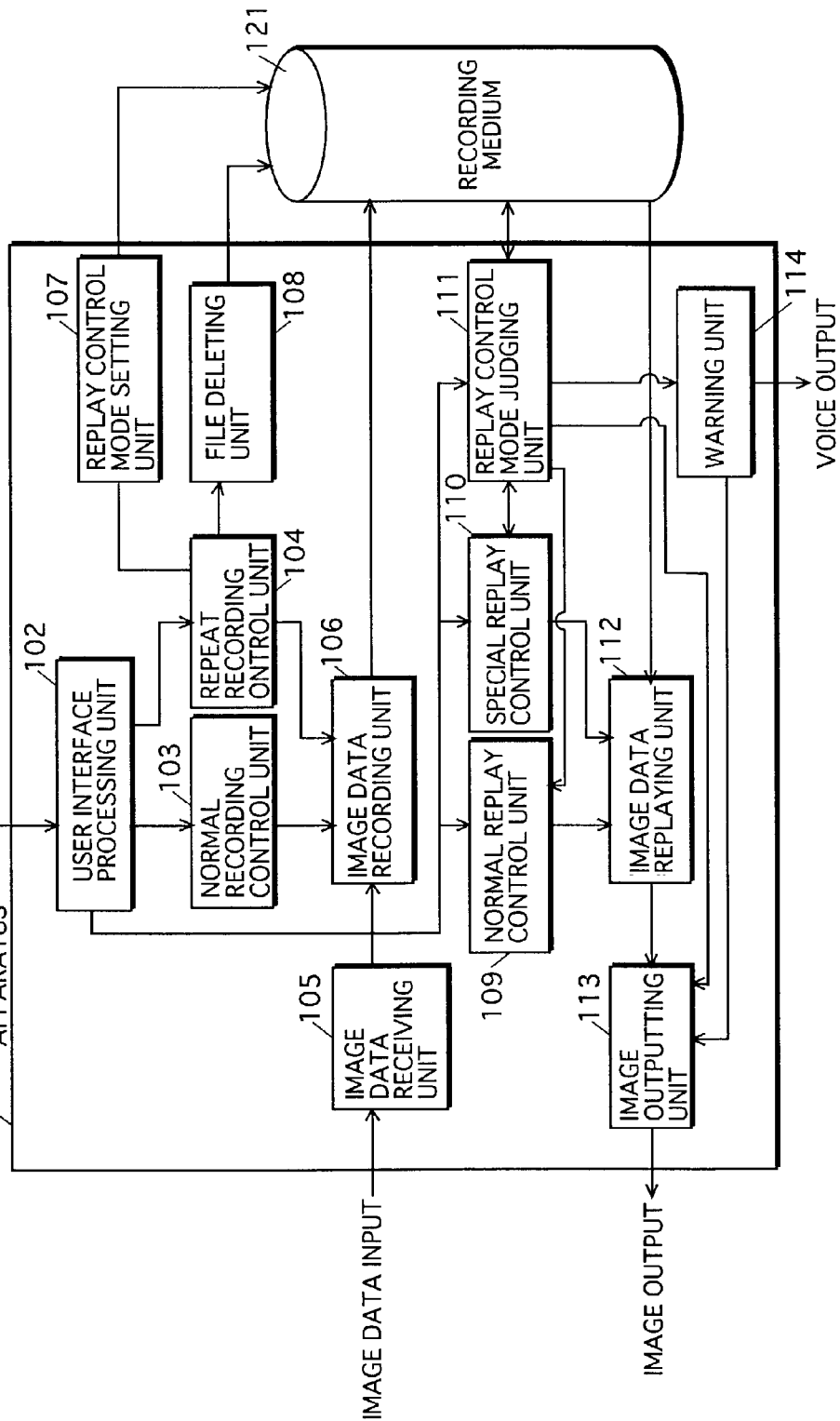

FIG.3A

301 REPLAY MODE TABLE

| FILE IDENTIFIER (302) | REPLAY CONTROL MODE (303) |
|---|---|
| BLOCK 1 | ALL-REPLAYS-AVAILABLE MODE |

FIG.3B

311 REPLAY MODE TABLE

| FILE IDENTIFIER | REPLAY CONTROL MODE |
|---|---|
| BLOCK 1 | REPLAY RESTRICTION MODE |
| BLOCK 2 | ALL-REPLAYS-AVAILABLE MODE |
| BLOCK 3 | ALL-REPLAYS-AVAILABLE MODE |
| ⋮ | ⋮ |
| BLOCK 18 | ALL-REPLAYS-AVAILABLE MODE |
| BLOCK 19 | ALL-REPLAYS-AVAILABLE MODE |
| BLOCK 20 | ALL-REPLAYS-AVAILABLE MODE |

401 REPLAY MODE TABLE

| FILE IDENTIFIER | REPLAY CONTROL MODE |
|---|---|
| BLOCK 2 | REPLAY RESTRICTION MODE |
| BLOCK 3 | ALL-REPLAYS-AVAILABLE MODE |
| BLOCK 4 | ALL-REPLAYS-AVAILABLE MODE |
| ⋮ | ⋮ |
| BLOCK 19 | ALL-REPLAYS-AVAILABLE MODE |
| BLOCK 20 | ALL-REPLAYS-AVAILABLE MODE |
| BLOCK 21 | ALL-REPLAYS-AVAILABLE MODE |

FIG.12

REPLAY MODE TABLE

| ADDRESS | REPLAY CONTROL MODE |
|---|---|
| 0000~1a00 | ALL-REPLAYS-AVAILABLE MODE |
| 2e09~3c00 | REPLAY RESTRICTION MODE |
| 3c01~d4f0 | ALL-REPLAYS-AVAILABLE MODE |

FIG. 13

1300 REPLAY MODE TABLE

| FILE IDENTIFIER | | REPLAY CONTROL MODE |
|---|---|---|
| BLOCK 2 | | REPLAY RESTRICTION MODE |
| BLOCK 3 | | ALL-REPLAYS-AVAILABLE MODE |
| BLOCK 4 | | ALL-REPLAYS-AVAILABLE MODE |
| ⋮ | | ⋮ |
| BLOCK 21 | ELAPSE TIME t | |
| | t > 5 SEC. OR MORE | ALL-REPLAYS-AVAILABLE MODE |
| | 1 SEC. < t ≦ 5 SEC. | FAST FORWARD WARNING SECTION |
| | 0 SEC. < t ≦ 1 SEC. | FAST FORWARD PROHIBITED SECTION |

IMAGE RECORDING AND REPLAYING APPARATUS, METHOD, PROGRAM, AND COMPUTER-READABLE RECORDING MEDIUM RECORDING THE PROGRAM

BACKGROUND OF THE INVENTION (1) Field of the Invention

The present invention relates to an image recording and replaying apparatus and method, and specifically to an image recording and replaying apparatus and method that allow image data recorded by a repeat recording to be replayed during the repeat recording, where the "repeat recording" refers to the recording of recently received image data so that the recorded image data does not exceed a predetermined amount that ensures a predetermined time period of replay, by continuously deleting earlier-recorded data.

(2) Description of the Related Art

In recent years, a unique TV receiver came on the market which has an accumulation-type set-top box (STB) containing a large-capacity hard disk drive. With such a construction, the TV receiver provides a repeat recording feature in which the TV receiver continues to record broadcast image data so that the recorded image data does not exceed a predetermined amount that ensures a predetermined time period of replay while the viewer watches the broadcast program, and on request allows the viewer to watch a scene he/she missed by replaying the scene which has been recorded in the repeat recording (hereinafter, such a replay is referred to as "delay replay").

FIG. 1 shows a conventional repeat recording performed by a conventional image recording and replaying apparatus. The image data is recorded and deleted onto/from a recording medium in units of files (blocks) each of which has a capacity equivalent to a replay time period of, for example, 5 minutes. It is supposed in this example that the viewer has specified "90 minutes" as the repeat recording time period, which is in reality converted to an amount of image data to be recorded to ensure the specified time period of repeat recording. In such conditions, the storage may have (a) a file for recording most recently received image data and (b) 90 (minutes)/5 (minutes)=18 files that record image data that have been received immediately before the most recently received image data. The files having recorded image data earlier are deleted in sequence after 90 minutes elapse since the image data has been recorded into the files.

As shown in FIG. 1, a current recording point is in the file "block 20", and the file "block 1" recording older data has been deleted.

If the user requests the delay replay with specification of the normal replay in this condition and the delay replay starts with the image data in the file "block 2", the delay replay is performed appropriately since the replay point moves as the recording point moves (that is to say, when the replay point moves to the file "block 3", the recording point moves to the file "block 21" which is not illustrated, and then the file "block 2" is deleted).

It should be noted here that in the above conventional example, image data is recorded and deleted in units of files (blocks), but instead of this, image data may be recorded in one file and older portion of the recorded image data may be overwritten with recently received image data, with this procedure being repeated as necessary.

However, the above-described conventional technique has the following problems.

First, the conventional technique does not support the delay replay by a special replay such as "rewind", "pause", or "slow replay". For example, if the user requests the delay replay by a slow replay in the same condition as shown in FIG. 1 and the slow replay starts with the file "block 2", then it may happen for example that when the recording point moves to the file "block 21", the file "block 2" is deleted while the replay point stays at the file "block 2" without moving to the file "block 3". This gives the user an inconvenience that the replay of the file "block 2" abruptly stops and skips to the file "block 3". It is expected that similar problems may occur to the other special replays in terms of the delay replay.

If, to solve the above-described problem due to the slow replay, the deletion of the file "block 2" was canceled, image data would be recorded in the recording medium without limitation, well extending the predetermined amount corresponding to the specified time period for the repeat recording.

In the case where older image data is repetitively overwritten with newer image data, it may happen during the delay replay that the recording point reaches the replay point, causing the repeat recording to stop, without input of a stop instruction by the viewer.

In the case of fast forward, the replay point may reach the recording point. When this happens, the recording of image data onto the recording medium is intermingled with the reading of image data from the recording medium.

SUMMARY OF THE INVENTION

The main object of the present invention is therefore to provide an image recording and replaying apparatus and method that ensure the delay replay including special replays such as pause during the repeat recording, prevent limitless recording of image data in the repeat recording, and prevent the recording point from reaching the replay point in the delay replay.

The sub object of the present invention is to provide an image recording and replaying apparatus and method that prevent the replay point from reaching the recording point in the delay replay by fast forward.

The main object of the present invention is fulfilled by an image recording and replaying apparatus that records image data onto a recording medium allowing a user to replay the recorded image data while continuing the recording, the image recording and replaying apparatus comprising: an image recording means for recording image data onto the recording medium; a replay means for replaying recorded image data in a replay mode selected from a plurality of replay modes; a judging means for judging, based on a relationship between a current recording point and a current replay point, whether the plurality of replay modes from which one is selected for the replay by the replay means should be limited to one or more replay modes; and a replay control means for, if the judging means judges that the plurality of replay modes should be limited to the one or more replay modes, instructing the replay means to replay the image data in one of the one or more replay modes.

In the above image recording and replaying apparatus, the judging means may include: a data-recorded-area dividing unit for dividing a data-recorded-area in the recording medium into two or more sections according to a recording time difference between each section and the current recording point, each section corresponding to a different combination of replay modes; and a judging unit for detecting a section containing the current replay point, and judging, based on the detected section, whether the plurality of replay modes from which one is selected should be limited to the one or more replay modes.

With the above-stated construction, when the current replay point exists in a replay restriction section, the image data in the section is read and replayed in such a replay mode as prevents the replayed image data from skipping.

In the above image recording and replaying apparatus, the image recording means may include a first image recording unit for recording image data into files each of which has a capacity that corresponds to a predetermined replay time period, the data-recorded-area dividing unit includes a file classifying unit for classifying the files into which the image data has been recorded by the first image recording unit, into (a) a first group corresponding to a specified recording time period having a length up to the current recording point, (b) a second group corresponding to a predetermined time period immediately before the specified recording time period, and (c) a third group corresponding to a time period immediately before the predetermined time period, and the judging unit includes a file judging unit for judging whether the current replay point exists in a file belonging to the second group, wherein when the file judging unit judges that the current replay point exists in a file belonging to the second group, the replay control means instructs the replay means to replay the image data in either fast forward or a standard replay.

Also in the above image recording and replaying apparatus, the image recording means may include a second image recording unit for recording image data into a file which has a capacity that corresponds to a length in time composed of a specified recording time period and double a predetermined time period, the data-recorded-area dividing unit includes an area classifying unit for classifying a recording area in the file into which the image data has been recorded by the second image recording unit, into (a) a first area section corresponding to the specified recording time period having a length up to the current recording point, (b) a second area section corresponding to the predetermined time period immediately before the specified recording time period, and (c) a third area section corresponding to the predetermined time period immediately before the second area section, the judging unit includes an area section judging unit for judging whether the current replay point exists in the second area section, wherein when the file judging unit judges that the current replay point exists in the second area section, the replay control means instructs the replay means to replay the image data in either fast forward or a standard replay.

With the above-stated construction in which the an amount of image data corresponding to more than the specified recording time period plus the predetermined time period is recorded, even if the specified recording time period has elapsed since the corresponding amount of image data was recorded, it is possible to prevent image data replayed by the delay replay from being skipped.

The above image recording and replaying apparatus may further comprise a deleting means for deleting files classified as belonging to the third group by the file classifying unit. Also, in the above image recording and replaying apparatus, after the second image recording unit has recorded image data into an entire area of the file, the second image recording unit may then record image data into the file by overwriting earliest recorded image data in the third area section with most recent image data.

With the above-stated construction, it is possible to prevent image data replayed by the delay replay from being skipped only by recording additional predetermined amount of data corresponding to the predetermined time period, not by recording limitless amount of image data.

The above image recording and replaying apparatus may further comprise an instruction receiving means for receiving an instruction to replay files belonging to the first group, wherein when the instruction receiving means receives an instruction to replay files belonging to the first group, the replay means reads image data from the files belonging to the first group and replays the read image data in either the standard replay or a special replay, and the image recording and replaying apparatus further comprising a warning means for, when the replay means is to read image data from a file belonging to the second group, outputting a warning that special replays other than fast forward are not available.

Also, the above image recording and replaying apparatus may further comprise: an instruction receiving means for receiving an instruction to replay image data recorded in the first area section, wherein when the instruction receiving means receives an instruction to replay image data recorded in the first area section, the replay means reads image data from the first area section and replays the read image data in either the standard replay or a special replay, and the image recording and replaying apparatus further comprising a warning means for, when the replay means is to read image data recorded in the second area section, outputting a warning that special replays other than fast forward are not available.

With the above-stated construction, it is possible to warn the user that a few special replays, performance of which is expected to cause replayed image data to be skipped, are not available when the target of the replay moves from image data recorded within the specified recording time period to image data recorded immediately before the specified recording time period.

In the above image recording and replaying apparatus, the warning means may include a mode receiving unit for displaying a plurality of available replay modes on an external monitor and waiting for notification by a user of one selected from the displayed replay modes, wherein the replay means reads image data from the files belonging to the second group and replays the read image data in the user-selected replay mode received by the mode receiving unit.

Also, in the above image recording and replaying apparatus, the warning means may include a mode receiving unit for displaying a plurality of available replay modes on an external monitor and waiting for notification by a user of one selected from the displayed replay modes, wherein the replay means reads image data from the second area section and replays the read image data in the user-selected replay mode received by the mode receiving unit.

With the above-stated construction, it is possible to replay image data corresponding to the specified recording time period plus the predetermined time period.

In the above image recording and replaying apparatus, when the mode receiving unit does not receive notification by the user of a replay mode in a predetermined duration, the replay means may read image data from the file belonging to the second group and replay the read image data in a default replay mode.

Also, in the above image recording and replaying apparatus, when the mode receiving unit does not receive notification by the user of a replay mode within a predetermined duration, the replay means may read image data from the second area section and replay the read image data in a default replay mode.

With the above-stated construction, it is possible to replay images without interruption even if the user does not specify a replay mode.

In the above image recording and replaying apparatus, the default replay mode may be the fast forward performed at such a speed as image data is read from the file belonging to the second group and replayed before the file belonging to the second group is classified as the third group and then deleted.

Also, in the above image recording and replaying apparatus, the default replay mode may be the fast forward performed at such a speed as image data is read from the second area section and replayed before the image data in the second area section is overwritten with most recent image data.

With the above-stated construction, it is possible to replay images without interruption.

In the above image recording and replaying apparatus, the warning means may output to an external speaker a warning voice that special replays other than the fast forward are not available.

With the above-stated construction, it is possible for the user to prevent replayed images from being interrupted.

The sub object of the present invention is fulfilled by the following construction in addition to the above construction, where the image recording means includes: a receiving unit for receiving image data; and a third image recording unit for recording the received image data onto the recording medium in units of clusters each of which has a predetermined size, the data-recorded-area dividing unit includes a first classifying unit for classifying a recording area in the recording medium into which the image data has been recorded by the third image recording unit, into (a) a specific-replay-mode-prohibited section in which most recently received image data making up a portion of a first cluster is recorded and the image data recorded in the specific-replay-mode-prohibited section is prohibited from being replayed in a specific replay mode, and (b) an all-replays-available section in which the remaining image data of the first cluster and the other recorded clusters is recorded and the image data recorded in the all-replays-available section can be replayed in any replay mode, and the judging unit includes a first judging unit for judging whether the current replay point exists in the specific-replay-mode-prohibited section, wherein when the first judging unit judges that the current replay point exists in the specific-replay-mode-prohibited section, the replay control means instructs the replay means to replay the image data in a standard replay.

With the above-stated construction, it is possible to prevent the replay point from reaching the recording point since the most recently recorded image data is replayed at the speed of standard replay.

In the above image recording and replaying apparatus, the data-recorded-area dividing unit may further include a second classifying unit for classifying the recording area further into a specific-replay-mode-warning section to which a certain number of cluster immediately before the specific-replay-mode-prohibited section belong, the judging unit includes a second judging unit for judging whether the current replay point exists in the specific-replay-mode-warning section, and the image recording and replaying apparatus further comprises a warning means for, when the second judging unit judges that the current replay point exists in the specific-replay-mode-warning section, outputting a warning that fast forward is not available.

With the above-stated construction, it is possible to warn a viewer that fast forward is not available since the replay point is approaching the real-time recording point.

The main object of the present invention is also fulfilled by an image recording and replaying method that records image data onto a recording medium allowing a user to replay the recorded image data while continuing the recording, the image recording and replaying method comprising: an image recording step for recording image data onto the recording medium; a replay step for replaying recorded image data in a replay mode selected from a plurality of replay modes; a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

With the above-stated construction, when the current replay point exists in a replay restriction section, the image data in the section is read and replayed in such a replay mode as prevents the replayed image data from skipping.

The main object of the present invention is also fulfilled by a program that causes a computer to execute an image recording and replaying method that records image data onto a recording medium allowing a user to replay the recorded image data while continuing the recording, the program comprising: an image recording step for recording image data onto the recording medium; a replay step for replaying recorded image data in a replay mode selected from a plurality of replay modes; a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

Using the above program, it is possible to prevent the replayed image data from skipping during the delay replay.

The main object of the present invention is also fulfilled by a computer-readable recording medium recording a program that causes a computer to execute an image recording and replaying method that records image data onto a first recording medium allowing a user to replay the recorded image data while continuing the recording, the program comprising: an image recording step for recording image data onto the first recording medium; a replay step for replaying recorded image data in a replay mode selected from a plurality of replay modes; a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

Applying the above computer-readable recording medium to an image recording and replaying apparatus, it is possible to prevent the replayed image data from skipping during the delay replay.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows the construction of the image recording and replaying apparatus in Embodiment 1 of the present invention;

FIG. 3A shows initial contents of the replay mode table recorded by the replay control mode setting unit in Embodiment 1;

FIG. 3B shows the contents of the replay mode table in Embodiment 1 immediately after the specified repeat recording time period and the predetermined time period have passed;

FIG. 12 shows an example of the replay mode table recorded by the replay control mode setting unit in Embodiment 2;

FIG. 13 shows an example of the replay mode table recorded by the replay control mode setting unit in Embodiment 3;

DESCRIPTION OF THE PREFERRED EMBODIMENT

Figure 1:
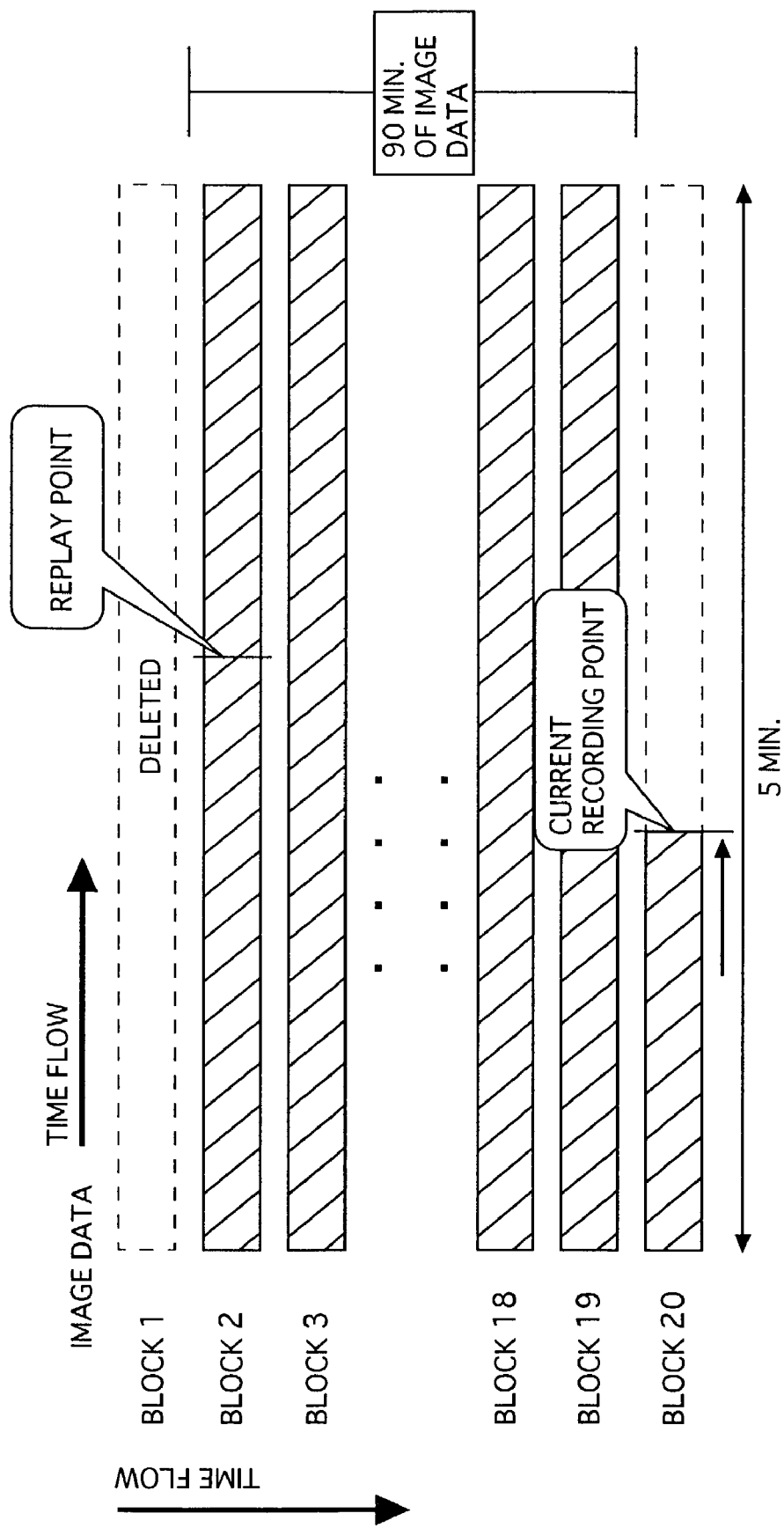
FIG. 1 shows a conventional repeat recording performed by a conventional image recording and replaying apparatus.

The following describes an image recording and replaying apparatus of the present invention according to the embodiments with reference to the drawings.

Embodiment 1

FIG. 2 shows the construction of the image recording and replaying apparatus in Embodiment 1 of the present invention.

The image recording and replaying apparatus 101 is connected to an external recording medium 121 which is achieved by a hard disk or the like, and includes, as shown in FIG. 2, a user interface processing unit 102, a normal recording control unit 103, a repeat recording control unit 104, an image data receiving unit 105, an image data recording unit 106, a replay control mode setting unit 107, a file deleting unit 108, a normal replay control unit 109, a special replay control unit 110, a replay control mode judging unit 111, an image data replaying unit 112, an image outputting unit 113, and a warning unit 114.

The user interface processing unit 102 receives a user instruction. If the user interface processing unit 102 receives a normal recording instruction, it notifies the normal recording control unit 103 of the normal recording instruction; and if receiving a repeat recording instruction, the user interface processing unit 102 notifies the repeat recording control unit 104 of the repeat recording instruction.

It should be noted here that the "repeat recording" refers to such a recording as image data is continuously recorded onto a recording medium by adjusting the amount of the recorded image data so as not to exceed a predetermined amount that corresponds to a scheduled time period, by continuously deleting earlier-recorded image data.

In the repeat recording, the user can specify a desired repeat recording time period, which is converted to a corresponding amount of recorded image data by the image recording and replaying apparatus 101. The user can replay image data with the delay replay function in so far as the desired image data has been recorded by the repeat recording during the specified repeat recording time period measured at the point in time when the user requests the replay, where the image data can be replayed in a special replay such as fast forward, rewind, pause, or slow replay, as well as in the standard replay. In the present embodiment, it is supposed that the user interface processing unit 102 receives, from the user, specification of the repeat recording time period together with the repeat recording instruction.

The user can request a delay replay of image data that is recorded in the repeat recording. The term "delay replay" refers to replay of image data recorded in the repeat recording. A normal (standard) replay and a plurality of special replays are available for the delay replay. The special replay includes "fast forward", "rewind", "pause", and "slow replay".

The user interface processing unit 102 also notifies the repeat recording control unit 104 of (a) the repeat recording time period specified by the user and (b) a repeat recording stop instruction input from the user.

The user enters a replay point as well as a replay instruction. A normal replay (standard replay) or a special replay can be specified with the replay instruction, and both types of replays may be requested as delay replays. When the user interface processing unit 102 receives from the user a normal replay (standard replay) instruction, it sends the received normal replay instruction and replay point to the normal replay control unit 109, and when receiving a special replay instruction, it sends the received special replay instruction and replay point to the special replay control unit 110. When receiving a delay replay instruction, it further sends the received delay replay instruction and replay point to the replay control mode judging unit 111. It should be noted here that since the present invention is directed to a delay replay, it is supposed in the following description that the replay instructions the user interface processing unit 102 receives from the user are all delay replay instructions.

In the present embodiment, the replay point is specified by a time period before which from the current time the user considers the desired image was broadcast and recorded.

The normal recording control unit 103, when notified of a normal recording instruction from the user interface processing unit 102, controls the image data recording unit 106 to record onto the recording medium 121 the image data received by the image data receiving unit 105.

The repeat recording control unit 104, when receiving from the user interface processing unit 102 a repeat recording instruction and the repeat recording time period, instructs the image data recording unit 106 to create in the recording medium 121 a file that can record a predetermined amount of image data equivalent to a replay time period of, for example, 5 minutes, and to record into the file the image data received by the image data receiving unit 105. Also, when receiving from the user interface processing unit 102 a repeat recording stop instruction, the repeat recording control unit 104 instructs the image data recording unit 106 to stop recording the image data into the recording medium 121.

Each time the repeat recording control unit 104 instructs the image data recording unit 106 to record image data, the repeat recording control unit 104 also instructs the replay control mode setting unit 107 to set a replay control mode for a file in which the image data is recorded. After the image data recording unit 106 starts recording image data into a file, the repeat recording control unit 104 instructs the replay control mode setting unit 107 to set an all-replays-available mode for the file. The repeat recording control unit 104 has a clock, and when a specified time elapses after the completion of the image data recording, the repeat recording control unit 104 instructs the replay control mode setting unit 107 to change the setting of the file from the all-replays-available mode to a replay restriction mode. When this is performed, if any replay control mode has been set for the file, the repeat recording control unit 104 instructs canceling of the replay control mode set for the file since the file is to be deleted, as will be described in detail later.

When the repeat recording control unit 104 instructs the replay control mode setting unit 107 to change the setting for the file from the all-replays-available mode to a replay restriction mode, the repeat recording control unit 104 instructs the file deleting unit 108 to delete a file in which the replay restriction mode has been set. That is to say, the repeat recording control unit 104 instructs the file deleting unit 108 to delete a file after the repeat recording time period plus a predetermined time period have elapsed since the completion of the image data recording.

The image data receiving unit 105 receives image data, which, for example, transmitted from a broadcast station as a broadcast program, and notifies the image data recording unit 106 of the receipt.

The image data recording unit 106, when receiving an instruction from the normal recording control unit 103 to record image data, records image data received from the image data receiving unit 105 onto the recording medium 121.

The image data recording unit 106, when receiving an instruction from the repeat recording control unit 104 to create a file and record image data, creates in a recording area in the recording medium 121 a file with a certain capacity, assigns an identifier to the file, and records image data received from the image data receiving unit 105 into the file. The image data recording unit 106 continues this procedure until it receives from the repeat recording control unit 104 an instruction to stop the recording.

The replay control mode setting unit 107, when receiving an instruction from the repeat recording control unit 104 to set replay control modes, records a replay mode table into the recording medium 121.

FIG. 3A show an example if the contents if the replay mode table immediately after a repeat recording has started. The replay mode table 301 has a file identifier column 302 for showing the identifier of each file and a replay control mode column 303 for showing the replay control mode set for each file. The example shown in FIG. 3A shows the state immediately after the start of recording image data into a file with an identifier "block 1". Under the control of the repeat recording control unit 104, the file "block 1" is set to the all-replays-available mode.

FIG. 3B shows an example of the contents of the replay mode table immediately after the specified repeat recording time period has passed since recording of image data into the file "block 1" completed.

At this point in time, as shown in the replay mode table 311, the replay control mode setting unit 107, as instructed by the repeat recording control unit 104, has changed the replay control mode of the file "block 1" to the replay restriction mode. The other files "block 2" to "block 20" are all set to the all-replays-available mode. At this point in time, the image data recording unit 106 has created a file "block 20" in the recording medium 121, and recorded image data in this file.

Figures 4, 5:
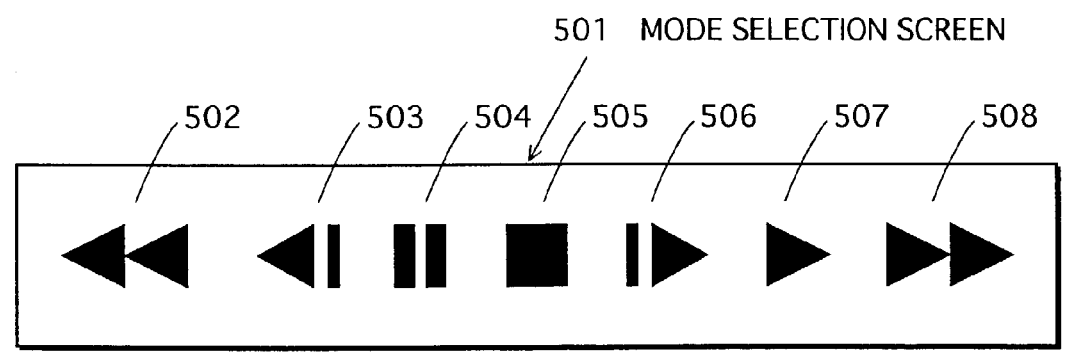
FIG. 4 shows the contents of the replay mode table in Embodiment 1 immediately after the predetermined time period has further passed since the time of FIG. 3B.
FIG. 5 shows an example of the mode selection screen that is displayed when the replay control mode judging unit judges that the file is set to the all-replays-available mode.

After a predetermined time period further passes, the contents of the replay mode table changes to be as shown in FIG. 4 as replay mode table 401. At this point in time, the image data recording unit 106 has created a file "block 21" in the recording medium 121, and has recorded image data into this file.

In the replay mode table 401 at this point in time, the replay control mode of the file "block 2" has been changed to the replay restriction mode, and the data for the file "block 1" has been deleted from this table.

The file deleting unit 108 deletes a file from the recording medium 121 when it receives an instruction to delete the file from the repeat recording control unit 104 after the repeat recording time period plus a predetermined time period have passed since the completion of recording image data into the file.

The normal replay control unit 109, when receiving the normal replay instruction and a replay point from the user interface processing unit 102, sends the replay point to the image data replaying unit 112. When receiving the normal replay (standard replay) instruction from the replay control mode judging unit 111, the normal replay control unit 109 notifies the image data replaying unit 112 of the normal replay instruction.

The special replay control unit 110, when receiving an instruction to perform a special replay such as fast forward, rewind, pause, slow replay (forward), slow replay (backward), from the user interface processing unit 102, notifies the image data replaying unit 112 of this instruction. In this case, if it receives specification for the fast forward replay speed from the replay control mode judging unit 111, the special replay control unit 110 notifies the image data replaying unit 112 of the specified speed.

The replay control mode judging unit 111, when receiving the replay point from the user interface processing unit 102, judges whether the file to which the received replay point belongs (that is to say, a currently replayed file) is set to the all-replays-available mode by referring to the replay mode table recorded in the recording medium 121. When it judges positively on the above judgment, the replay control mode judging unit 111 instructs the image outputting unit 113 to display a mode selection screen shown in FIG. 5 by superimposing the mode selection screen on the currently displayed image so that the user can select a replay mode.

The mode selection screen 501 contains several signs respectively corresponding to different replay modes from which the user can select one. The sign 502 represents rewind, 503 slow replay (backward), 504 pause, 505 stop, 506 slow replay (forward), 507 standard replay, and 508 fast forward.

The user can select one of the displayed signs to determine the replay mode. Note that if the sign 504 representing replay stop is selected, the replay stops.

Figure 7:
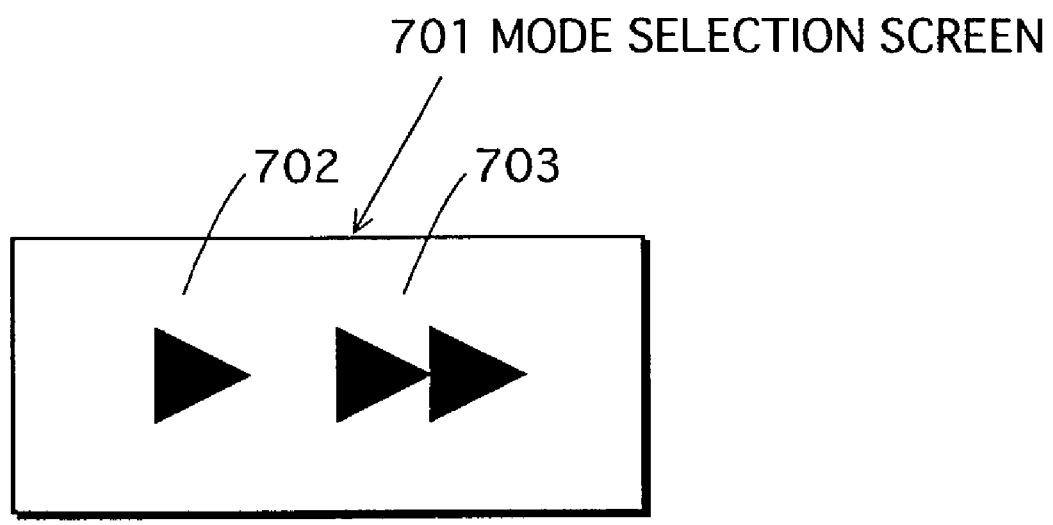
FIG. 7 shows an example of the mode selection screen that is displayed when the replay control mode judging unit judges that the file is set to the replay restriction mode.

The replay control mode judging unit 111, when receiving the replay point of the currently replayed image data from the image data replaying unit 112, refers to the replay mode table (examples are shown in FIG. 4 and other drawings) recorded in the recording medium 121 and judges whether the replay control mode of the file to which the replay point belongs is the replay restriction mode or the all-replays-available mode. When judging that the mode is the all-replays-available mode, the replay control mode judging unit 111 does not perform a specific process, but when judging that the mode is the replay restriction mode, the replay control mode judging unit 111 notifies the warning unit 114 of the judgment, and also instructs the image outputting unit 113 to output a mode selection screen 701 shown in FIG. 7 to an external monitor.

The mode selection screen 701 contains only two signs 702 and 703 representing the normal replay (standard replay) and fast forward, respectively.

When there is no input of selection of a replay mode from the user for a certain duration (for example, for one minute) after the mode selection screen 701 is displayed on the external monitor, the replay control mode judging unit 111 instructs the normal replay control unit 109 to replay the image data in the standard replay mode as a default. In doing this, when it is judged that the file cannot be read and replayed completely with the standard replay mode, the replay control mode judging unit 111 instructs the special replay control unit 110 to perform fast forward as a default, calculates the speed of the fast forward using (a) the time period required for deleting the file and (b) the amount of image data to be replayed, and notifies the special replay control unit 110 of the calculated fast forward speed.

The image data replaying unit 112, when receiving the normal replay instruction and replay point from the normal replay control unit 109, reads, at a standard replay speed, the image data from the file containing the replay point in the recording medium, and sends the read image data to the image outputting unit 113.

The image data replaying unit 112, when receiving the special replay instruction, for example, an instruction to fast forward, from the special replay control unit 110, reads, at a fast forward speed, the image data starting from the replay point, and sends the read image data to the image outputting unit 113. When the replay speed has been notified, the image data replaying unit 112 reads and replays the image data at the notified replay speed.

The image data replaying unit 112 further sends the replay point in the file, from which it is reading image data currently, to the replay control mode judging unit 111.

The image outputting unit 113 outputs the image data received from the image data replaying unit 112 to the external monitor. If the mode selection screen 501 or 701 is sent from the replay control mode judging unit 111, the image outputting unit 113 also outputs the mode selection screen so as to be superimposed on the image. Similarly, if a warning screen 601 is sent from the warning unit 114, the image outputting unit 113 also outputs the warning screen 601 so as to be superimposed on an image screen 602, as shown in FIG. 6.

Figure 6:
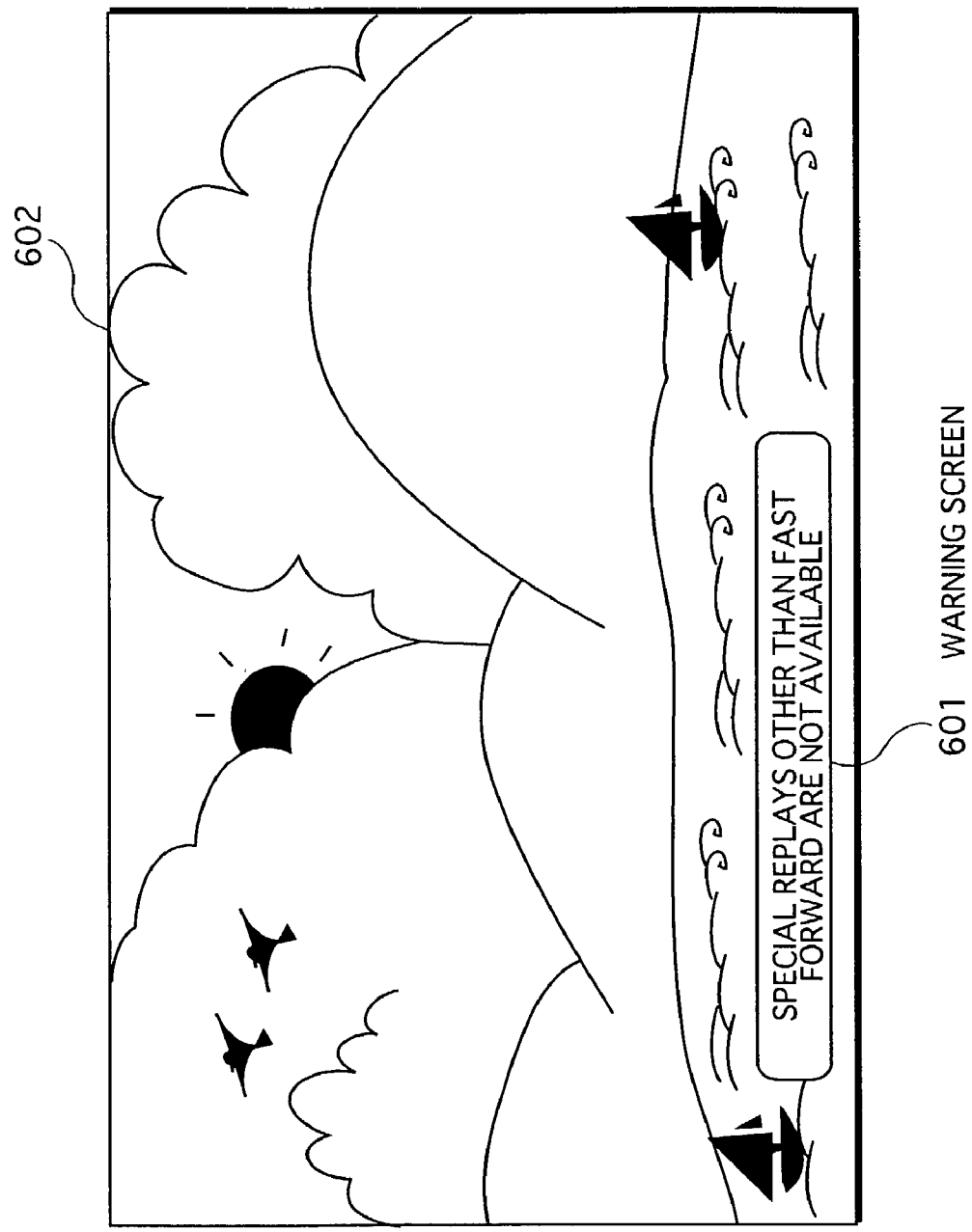
FIG. 6 shows an example of the warning screen generated by the warning unit in Embodiment 1.

The warning unit 114, when notified from the replay control mode judging unit 111 of the replay restriction mode set to the file containing the currently replayed image data, instructs the image outputting unit 113 to output the warning screen 601 as shown in FIG. 6.

It should be noted here that the mode selection screen 701 is displayed after the waning screen 601 is displayed.

The warning unit 114 also outputs a voice, while the warning screen 601 is displayed, to an external speaker to convey that special replays other than the fast forward are not available.

The external recording medium 121 is achieved by a rewritable, large-capacity recording medium such as a hard disk or a DVD-RAM.

Figure 8:
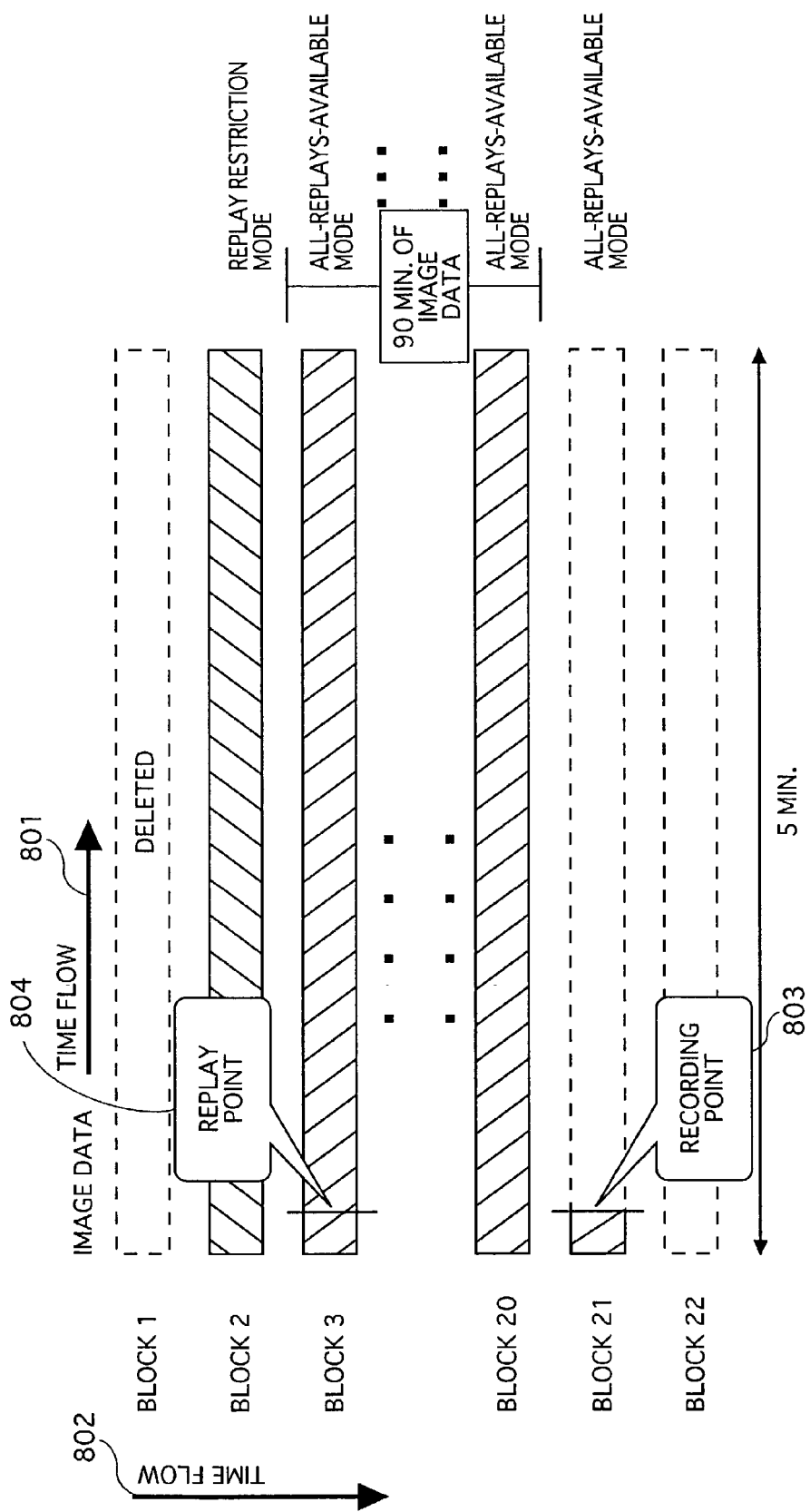
FIG. 8 shows image data recorded onto the external recording medium in Embodiment 1.

FIG. 8 shows image data recorded onto the external recording medium 121 by the image data recording unit 106. In this example, the specified repeat recording time period is 90 minutes, and image data to be replayed for 5 minutes is recorded in each file in the direction of the "time flow" indicated by the arrow 801. Each file is assigned with an identifier such as "block 1" or "block 22" shown in this drawing. The example shown in FIG. 8 indicates that the file "block 1" has been deleted, and that the file "block 22" has not been created. The replay control modes set to the files, appearing on the right-hand side of FIG. 8, correspond to the replay control modes shown in the replay mode table shown in FIG. 4.

FIG. 8 indicates that the image data is recorded into each file in the direction of time indicated by the arrow 801, and that the image data is recorded in units of files in the direction of time indicated by the arrow 802.

Suppose here that the user has requested a delay replay with a replay point "90 minutes (before)" via the user interface processing unit 102 when a recording point 803 is in the file "block 21" (that is to say, the image data is currently recorded into the file "block 21").

In the example shown in FIG. 8, a replay point 804 is currently in the file "block 3" that is set to the all-replays-available mode. Accordingly, any special replay (for example, rewind) is available. Here, if the user requests rewind, the replay point 804 would move from the file "block 3" to the file "block 2" over time. On the other hand, as time goes by, the recording point 803 would move from the file "block 21" to the file "block 22", the file "block 2" would be deleted, and then the file "block 3" containing the image data currently indicated by the replay point 804 would be deleted. Accordingly, in this case, when the replay point 804 moves to the file "block 2", the warning screen generated by the warning unit 114 is superimposed on the image screen 602 on the external monitor to warn the user to select fast forward or standard replay. When the user selects the standard replay when the replay point 804 is in the file "block 2", the replay point would move to the file "block 3", so that the replay of image data would continue without interruption.

When the user does not select one from the offered replay modes and continues to operate rewind despite the warning by the warning unit 114 then the replay point 804 eventually moves to the start of the file "block 2", image data is read and replayed at such a fast forward speed as the replay point 804 moves from the file "block 2" to the file "block 3" before the file "block 2" is deleted by the file deleting unit 108. This prevents a file from being deleted halfway through a replay of the file, resulting in the replay of the image data without interruption.

Now, the operation of the present embodiment will be described with reference to the flowcharts shown in FIGS. 9 and 10.

Figure 9:
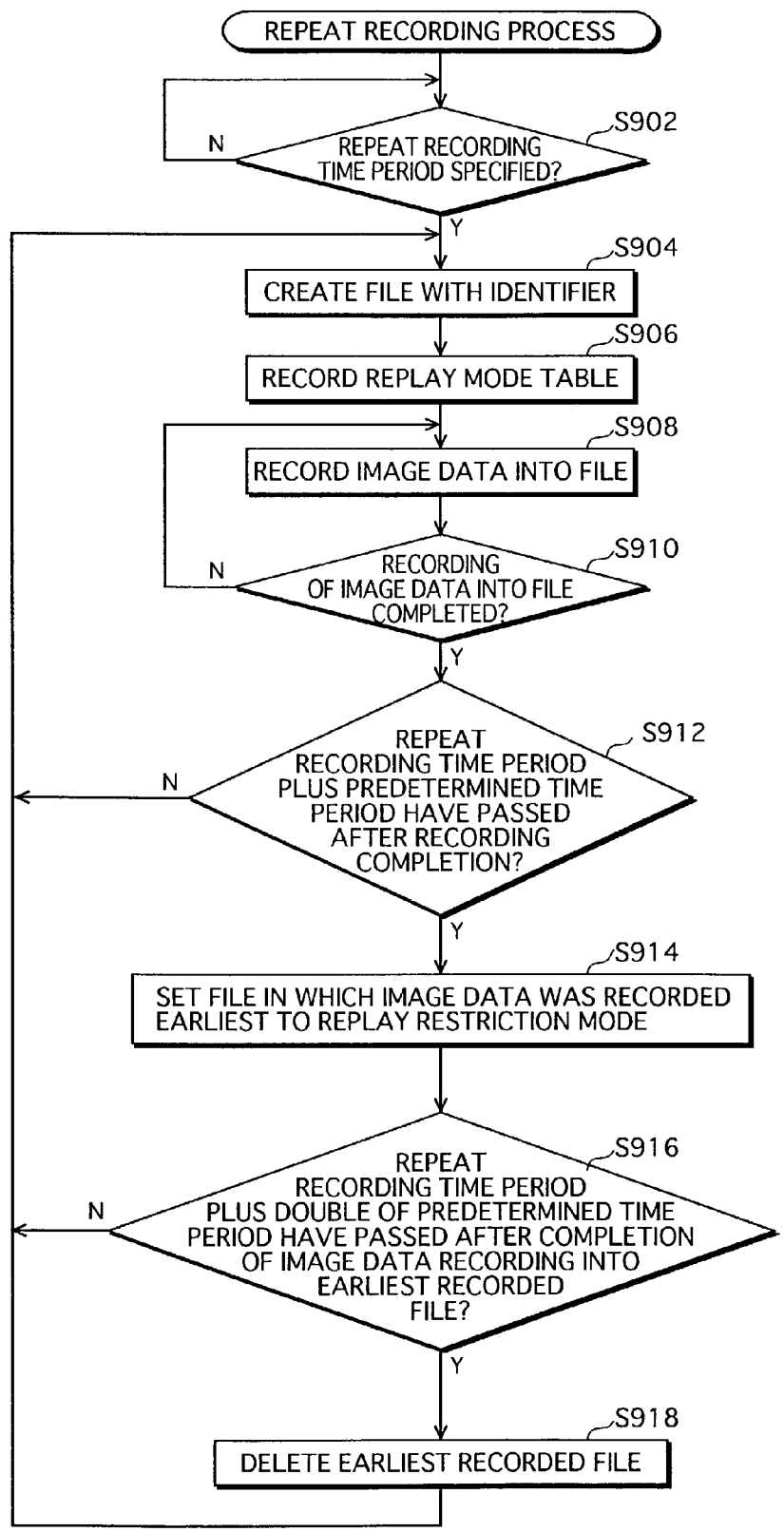
FIG. 9 is a flowchart showing the procedures of the repeat recording in Embodiment 1.

FIG. 9 is a flowchart showing the procedures of the repeat recording.

First, the repeat recording control unit 104 waits for a repeat recording time period specified by the user to be received from the user interface unit 102 (S902). After receiving the repeat recording time period, the repeat recording control unit 104 instructs the image data recording unit 106 to record image data, and instructs the replay control mode setting unit 107 to record the replay mode table.

The image data recording unit 106 creates a file in the external recording medium 121, with an identifier assigned thereto (S904).

The replay control mode setting unit 107 records the replay mode table (S906). The image data recording unit 106 records image data received by the image data receiving unit 105 into a file that can record a predetermined amount of image data equivalent to a predetermined replay time period (S908). The image data recording unit 106 continues to record image data into the file until the file has recorded the predetermined amount of image data (S910).

The repeat recording control unit 104 judges whether the repeat recording time period plus the predetermined time period have passed after the completion of the image data recording (S912). If the judgment result is negative, the control returns to S904, and if the judgment result is positive, the control moves to S914 in which according to an instruction received from the replay control mode setting unit 107, the repeat recording control unit 104 sets a file in which the image data was recorded the earliest to the replay restriction mode (S914).

Then, the repeat recording control unit 107 judges whether the repeat recording time period plus double of the predetermined time period have passed after the completion of the image data recording into the earliest recorded file (S916). If the judgment result is negative, the control returns to S904, and if the judgment result is positive, the control moves to S918 in which the file deleting unit 108 is instructed to delete the earliest recorded file, and deletes the file (S918), then the control returns to S904.

The above-described procedure is continued until the repeat recording control unit 104 receives from the user interface processing unit 102 a user instruction to stop the repeat recording.

Figure 10:
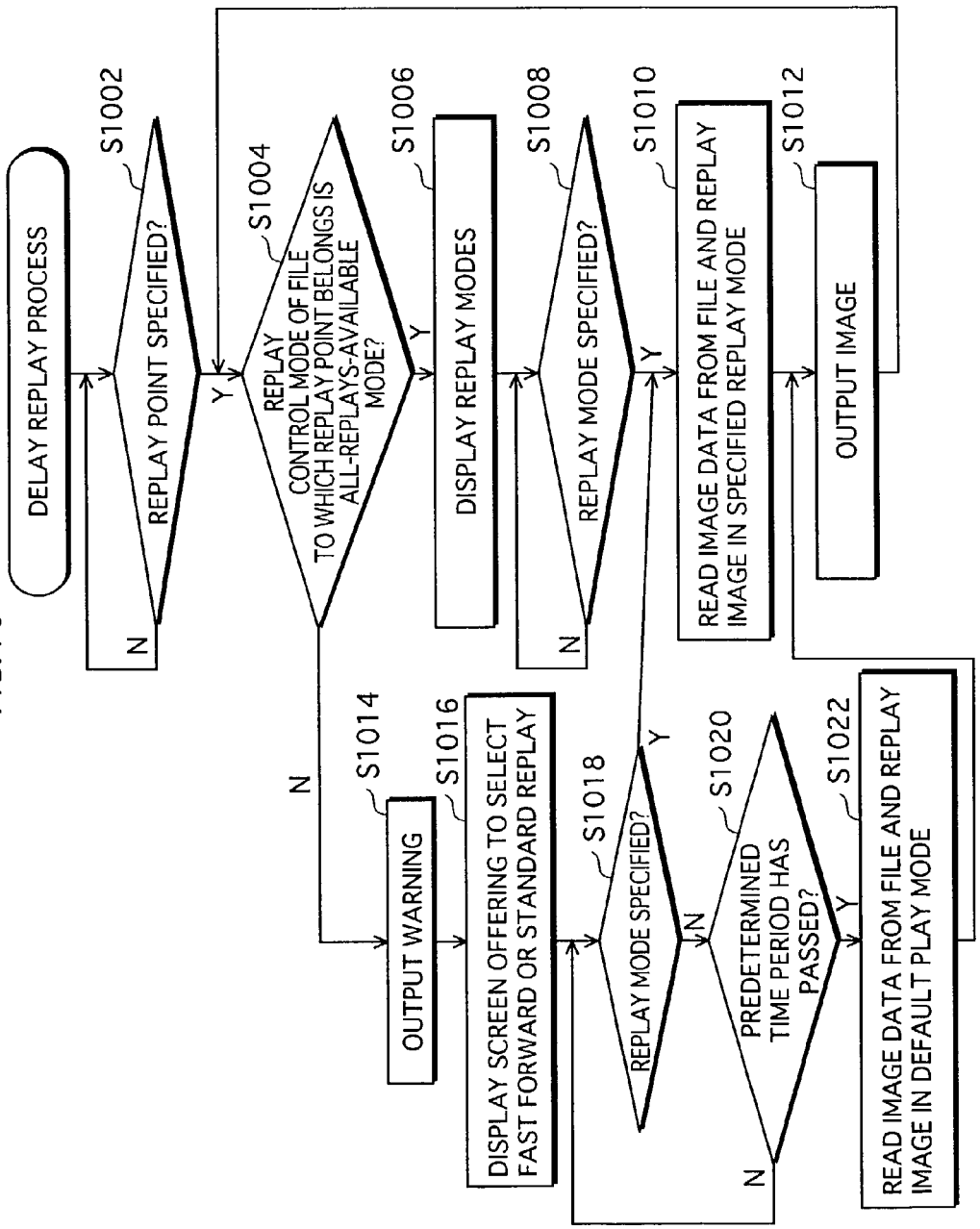
FIG. 10 is a flowchart showing the procedures of the delay replay in Embodiment 1.

FIG. 10 is a flowchart showing the procedures of the delay replay.

First, the user interface processing unit 102 waits for a replay point to be specified by the user (S1002). If it is specified, the control moves to S1004 in which the replay point is sent to the replay control mode judging unit 111, and the replay control mode judging unit 111 judges whether the replay control mode of the file to which the replay point belongs is the all-replays-available mode or the replay restriction mode by referring to the replay mode table (S1004). If it is the all-replays-available mode, the control moves to S1006 in which the image outputting unit 113 is instructed to output a mode selection screen to the monitor so that the user can select a replay mode from options that include special replays (S1006).

The user interface processing unit 102 waits for a replay mode to be specified by the user (S1008). If a replay mode is selected, the control moves to S1010 in which the normal replay control unit 109 is notified of a standard replay mode, and the special replay control unit 110 is notified of a special replay mode, and the image data replaying unit 112 reads image data from a file in the external recording medium 121 starting from the replay point, and replays the image in the specified replay mode (S1010), and notifies the image outputting unit 113 of it.

The image outputting unit 113 outputs the image to the external monitor (S1012), and returns to S1004.

If it is judged in S1004 that the currently replayed file is set to the replay restriction mode, the control goes to S1014 in which the warning unit 114 outputs a warning voice and a warning screen to be displayed on the external monitor (S1014).

The replay control mode judging unit 111 allows, via the image outputting unit 113, the external monitor to display a mode selection screen, replacing the warning screen, offering to select fast forward or the standard replay (S1016), and waits for a replay mode to be specified by the user (S1018). If the user specifies a replay mode, the control moves to S1010.

If the user has not specified a replay mode after a predetermined time period has passed (S1020), the replay control mode judging unit 114 determines either the standard replay mode or the fast forward as a default, and the image data replaying unit 112 reads image data from the file and replays the image in the determined replay mode (S1022), and the control goes to S1012.

Embodiment 2

The construction of the image recording and replaying apparatus in Embodiment 2 is the same as that in Embodiment 1 except that it does not contain the file deleting unit 108. The following describes only the differences from Embodiment 1.

The repeat recording control unit 104, when receiving a repeat recording time period specified by the user from the user interface processing unit 102, instructs the image data recording unit 106 to create a file in the recording medium 121 and record image data into the file. The repeat recording control unit 104, having a clock, starts measuring the time as the image data recording unit 106 starts recording image data, and instructs the replay control mode setting unit 107 to set the all-replays-available mode to an area section in which image data was recorded for the specified repeat recording time period (for example, 90 minutes) plus a predetermined time period (for example, 5 minutes) after the image data recording unit 106 starts recording the image data. Further, the repeat recording control unit 104 instructs the replay control mode setting unit 107 to set the replay restriction mode to an area section in which image data was recorded for the next predetermined time period (from 95 minutes after to 100 minutes after the recording start. In this way, the repeat recording control unit 104 sends such an instruction every predetermined time period.

The repeat recording control unit 104 also instructs the image data recording unit 106 to record image data into an area section that has stored image data for more than the repeat recording time period plus double the predetermined time period. That is to say, in this example, the repeat recording control unit 104 instructs the image data recording unit 106 to overwrite the oldest piece of image data having been stored in an area section for more than 100 minutes with a new piece of image data.

When receiving the repeat recording instruction from the repeat recording control unit 104, the image data recording unit 106 creates a file in the recording medium 121, and records image data received by the image data receiving unit 105 into the file. Also, when receiving an instruction to overwrite image data from the repeat recording control unit 104, the image data recording unit 106 overwrites the oldest piece of image data among the currently recorded image data with a new piece of image data received by the image data receiving unit 105.

The replay control mode setting unit 107 updates the settings of the replay control mode (the all-replays-available mode and the replay restriction mode) for each area section in the recording medium 121 in which image data is recorded, based on the replay control mode notified from the repeat recording control unit 104. This updating is performed every predetermined time period after the specified repeat recording time period passes.

FIGS. 11A to 11G show changes in the image data recorded in the recording medium 121 over time. In these drawings, areas with a dense hatch pattern indicate that the replay restriction mode is set to the areas; and areas with a light hatch pattern indicate that the all-replays-available mode is set to the areas.

Figure 11:
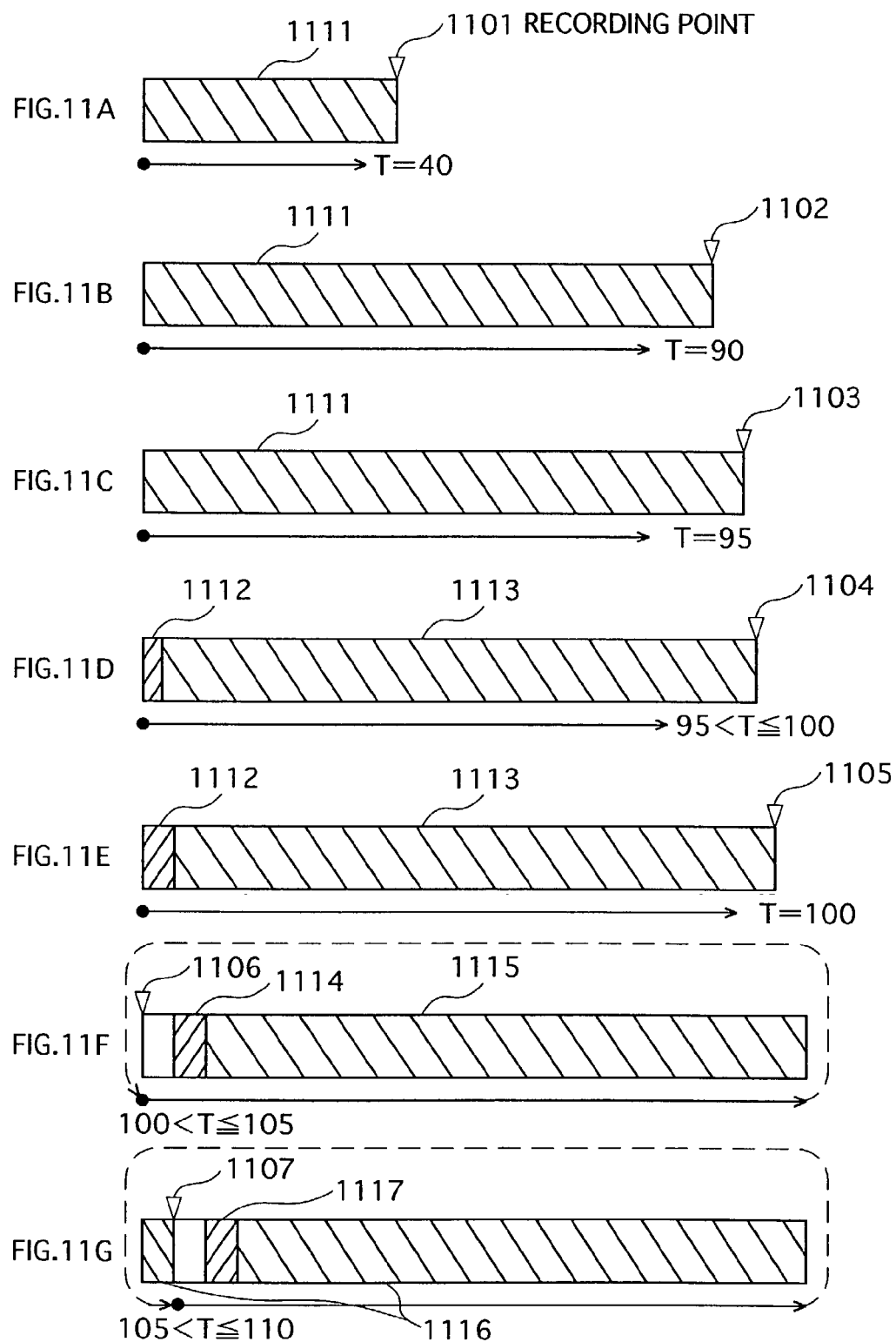
FIGS. 11A to 11G show changes in the image data recorded on the recording medium over time in the image recording and replaying apparatus of Embodiment 2.

As shown in FIGS. 11A to 11C, the all-replays-available mode is set to the entire area 1111 until the repeat recording time period (90 minutes) plus a predetermined time period (5 minutes) elapse, where the recording points 1101, 1102, and 1103 indicate that 40, 90, and 95 minutes have elapsed since the recording start, respectively.

As shown in FIGS. 11D and 11E, during a time period from 95 minutes after to 100 minutes after the recording start, the replay restriction mode is set to the area section 1112 in which image data was recorded for the first 5 minutes, and the all-replays-available mode is set to the remaining area 1113 up to the recording point 1104 or 1105.

As shown in FIG. 11F, during a time period from 100 minutes (that is, the repeat recording time period plus double the predetermined time period) after to 105 minutes (further predetermined time period) after the recording start, the recording point (1106 in FIG. 11F) moves to an area section in which the image data was recorded for the first 5 minutes and the most recently received image data is recorded therein, overwriting the earlier recorded image data. Also, the replay restriction mode is set to the area section 1114 in which the image data was recorded for 5 minutes during a time period from 5 minutes after the recording start to 10 minutes after the recording start; and the all-replays-available mode is set to the remaining area 1115 in which the image data has been recorded from 10 minutes after the recording start to the recording point 1106.

As shown in FIG. 11G, during a time period from 105 minutes after the recording start to 110 minutes after the recording start, the all-replays-available mode is set to the area section 1116 in which the image data has been recorded from 15 minutes after the recording start to the recording point 1107; and the replay restriction mode is set to the area section 1117 in which the image data was recorded for 5 minutes during a time period from 10 minutes after the recording start to 15 minutes after the recording start The above-described pattern is repeated every predetermined time period, the area section to which the replay restriction mode is set moving one after another.

The replay control mode setting unit 107 records a replay mode table in the recording medium 121, where the replay mode table shows the replay control modes set to the above-described areas in the recording medium 121.

FIG. 12 shows an example of the replay mode table. The replay mode table 1201 has an address column 1202 for showing the address of each area section and a replay control mode column 1203 for showing the replay control mode of each area section. The replay mode table 1201 corresponds to the image data recording state shown in FIG. 11G.

As shown in FIG. 12, the all-replays-available mode is set to the area sections with the addresses "0000-1a00" and "3c01-d4f0", and the replay restriction mode to the area section with the address "2e09-3c00". These replay control modes are updated by the replay control mode setting unit 107 every predetermined time period, as described earlier.

In Embodiment 1, the replay control mode judging unit 111 judges whether the file in which a received replay point exists is the all-replays-available mode or the replay restriction mode, while in Embodiment 2, it judges whether the area section with an address in which a received replay point exists is the all-replays-available mode or the replay restriction mode.

As described above, in the repeat recording process of Embodiment 1, a file is created and image data is recorded in the created file every predetermined time period, and the replay control mode is set in units of files, while in Embodiment 2, the area for one file is divided into a plurality of area sections which are identified by the addresses, the replay control mode is set in units of area sections, and earlier recorded image data is overwritten with newly recorded image data without deleting files.

Also, in the delay replay in Embodiment 1, the replay control mode is determined in terms of the file in which the replay point exists, while in Embodiment 2, it is determined in terms of the area section in which the replay point exists.

The operation in Embodiment 2 is the same as that in Embodiment 1 except for the operation relating to the above-described differences, and therefore is omitted here.

Embodiment 3

In Embodiments 1 and 2, the user can select any replay mode including special replays such as pause and slow replays during the specified repeat recording time period. In Embodiment 3, the most recently recorded image data is prohibited from being fast-forwarded. The construction of Embodiment 3 is similar to that of Embodiment 1. As a result, the differences in the construction of Embodiment 3 from Embodiment 1 will be described with reference to FIG. 2 showing the construction of Embodiment 1.

The repeat recording control unit 104, when receiving from the user interface processing unit 102 a repeat recording instruction, instructs the replay control mode setting unit 107 to set a time period of 1 second after the start of the image data recording in the standard replay time to "fast forward prohibited section", set a time period of 4 seconds after the replay-prohibited section to "fast forward warning section", and set the succeeding time period to the all-replays-available mode.

The image data recording unit 106 records the image data received by the image data receiving unit 105 onto the recording medium 121 in units of clusters, each of which is approximately 1 MB in size. The image data to be replayed for 1 second in the standard replay time corresponds to the image data of 1 cluster.

The replay control mode setting unit 107, when receiving from the repeat recording control unit 104 an instruction to set the replay control mode, records a replay mode table onto the recording medium 121.

FIG. 13 shows the replay mode table 1300 when a small amount of time have lapsed after the repeat recording time period plus a predetermined time period lapsed. The replay mode table 1300 is similar to the replay mode table 401 shown in FIG. 4 except that the file "block 21" into which image data is currently recorded by the image data recording unit 106 is divided into 3 sections according to the elapse-time. That is to say, a section between the elapse times of no less than 0 second and 1 or less seconds is defined as the fast forward prohibited section, a section between the elapse times of no less than 1 second and 5 or less seconds is defined as the fast forward warning section, and a section having the elapse time of no less than 5 seconds is defined as the all-replays-available mode section.

Every time the image data recording unit 106 records, in units of clusters, the image data received by the image data receiving unit 105, the replay control mode setting unit 107 converts from the cluster units to the standard replay time, and judges whether 1 second has passed, and depending on the results of the judgment, sets or updates the three types of sections. Note that although in the replay mode table 1300 shown in FIG. 13, the sections are defined by the elapse times, but in reality, the sections are defined by the addresses in the recording medium 121.

When receiving from the replay control mode judging unit 111 a normal replay instruction, the normal replay control unit 109 instructs the image data replaying unit 112 to read image data from the recording medium 121 at the standard replay speed starting with the replay point of the currently replayed image data.

When receiving from the replay control mode judging unit 111 an instruction to stop fast forward, the special replay control unit 110 instructs the image data replaying unit 112 to stop reading image data from the recording medium 121 at the speed of fast forward.

When receiving from the image data replaying unit 112 the replay point of the currently replayed image data, the replay control mode judging unit 111 judges whether the file to which the received replay point belongs is the all-replays-available mode or the replay restriction mode, and also judges whether the replay point belongs to the fast forward warning prohibited section or the fast forward warning section.

When the replay control mode judging unit 111 judges that the replay point belongs to the fast forward warning section by referring to the address of the replay point and the addresses shown in the replay mode table, the replay control mode judging unit 111 notifies the warning unit 114 of it; and when it judges that the replay point belongs to the fast forward prohibited section, the replay control mode judging unit 111 instructs the special replay control unit 110 to stop fast forward, instructs the normal replay control unit 109 to perform a normal replay, and sends to the image outputting unit 113 a mode selection screen containing replay modes for selection by the user to be displayed on the external monitor. The mode selection screen displayed here is the same as that shown in FIG. 5 except that it does not include the sign 508 representing fast forward.

When receiving from the special replay control unit 110 an instruction to stop reading image data at a fast forward speed, and from the normal replay control unit 109 an instruction to read image data at the standard replay speed, the image data replaying unit 112 reads image data at the standard replay speed starting with the replay point of the currently replayed image data, and sends the read image data to the image outputting unit 113.

When the image outputting unit 113 receives a warning screen from the warning unit 114, it outputs the warning screen to the external monitor so as to be displayed on it; and when it receives a mode selection screen, it also outputs the mode selection screen to the external monitor so as to be displayed on it.

The warning unit 114, when notified from the replay control mode judging unit 111 that area section containing the currently replayed image data is the fast forward warning section, sends to the image outputting unit 113 a warning screen including a message "fast forward is not available". The warning unit 114 also outputs a warning voice.

Now, the delay replay in the present embodiment will be described with reference to FIG. 14.

Figure 14:
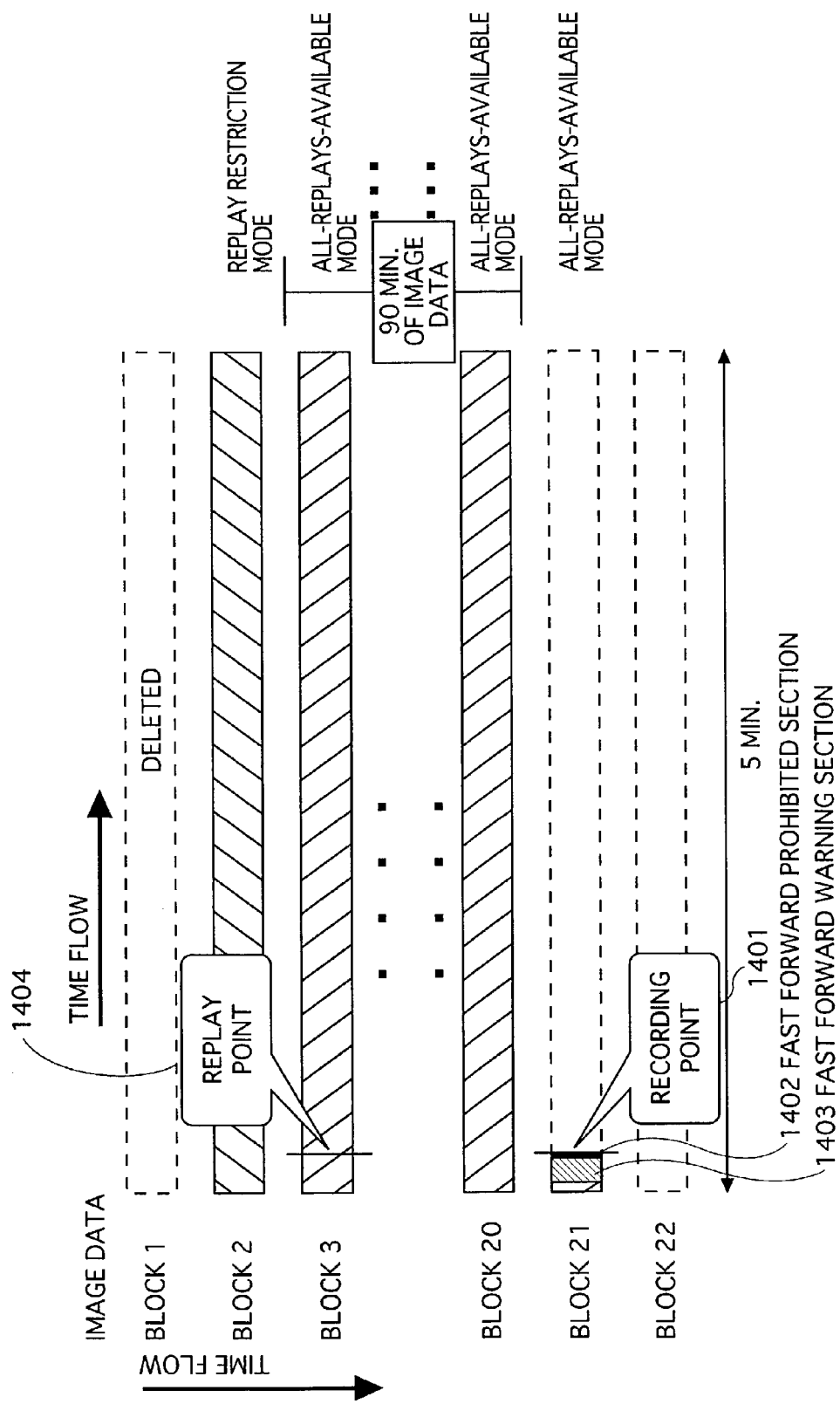
FIG. 14 shows a recording point and a replay point for image data recorded onto an external recording medium in Embodiment 3.

FIG. 14 shows the state in which the file "block 21" has a recording point 1401, a section corresponding to a time period of approximately 1 second before the recording point 1401 is the fast forward prohibited section 1402, and a section corresponding to a time period of approximately 4 seconds before the section 1402 is the fast forward warning section 1403.

Figure 15:
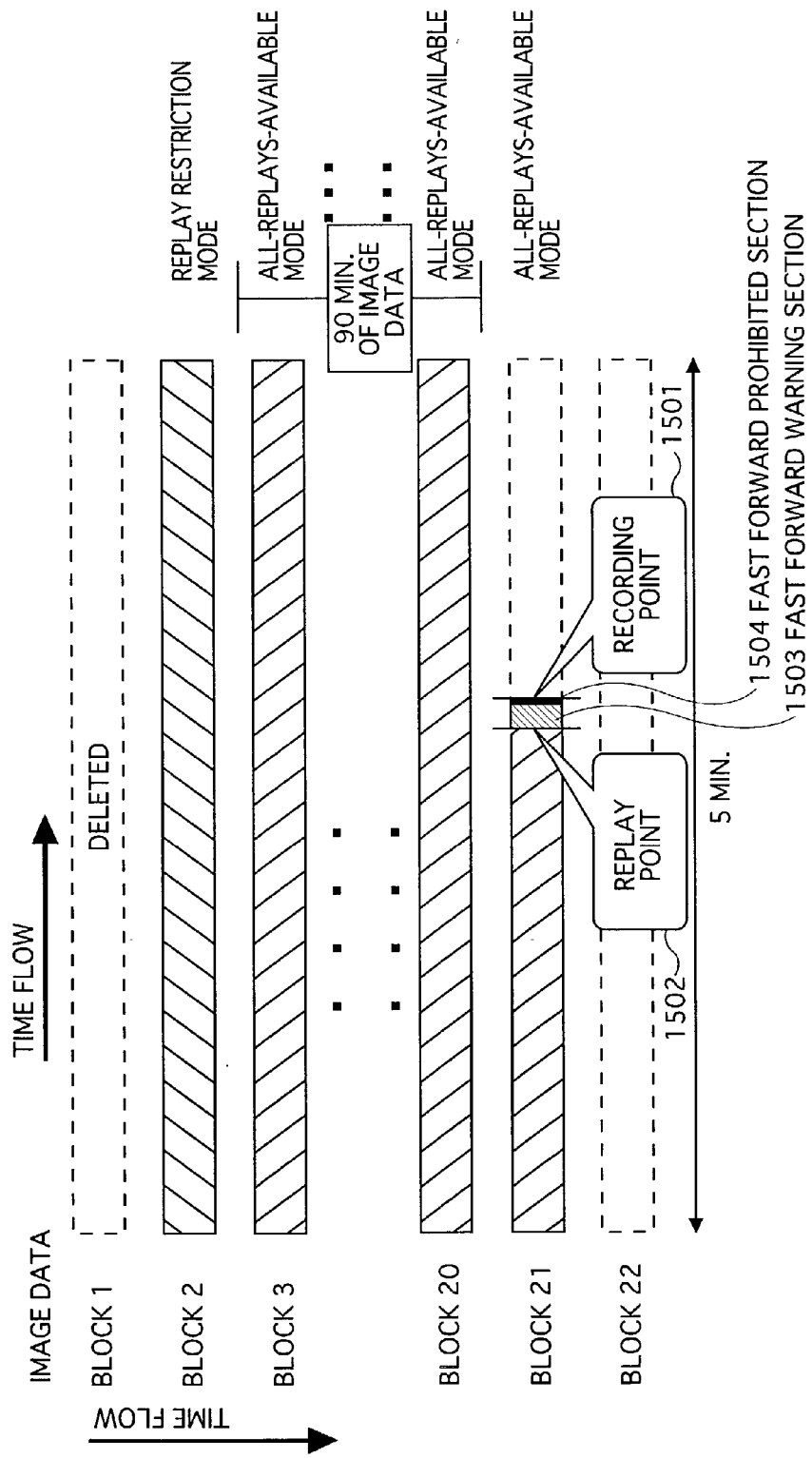
FIG. 15 shows a state in which the replay point is approaching the recording point in Embodiment 3.

The drawing indicates that when the file "block 3" has the replay point 1404, the user requests to replay image data of 90 minutes before. All types of replay modes are available at the replay point 1404. Suppose that after this, the user changes the replay point 1404 by, for example, specifying image data of 10 minutes before the current recording point, selects fast forward. Then, as time goes by, both the recording point and the replay point move forwards until they reach the positions respectively indicated as 1501 and 1502 in FIG. 15.

Figure 16:
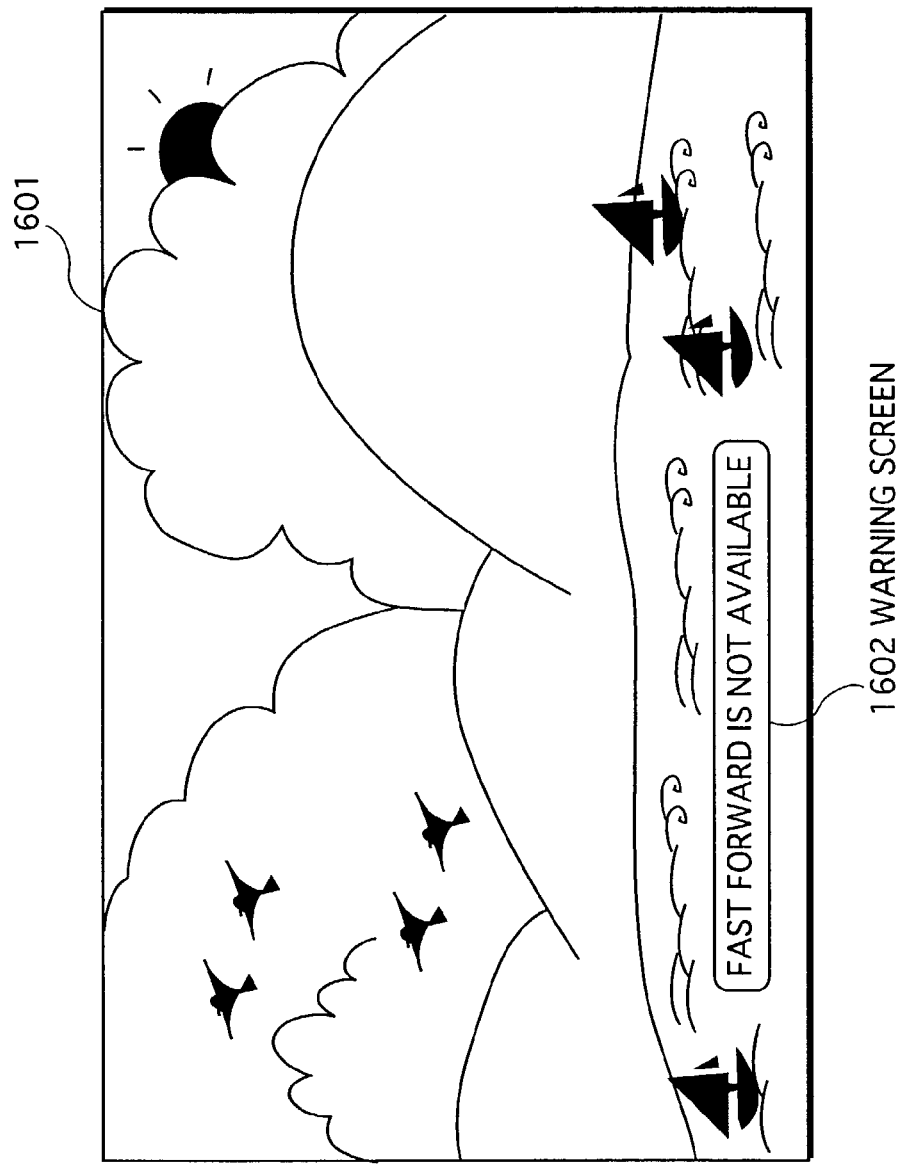
FIG. 16 shows a warning screen displayed on an external monitor when the replay point reaches a fast forward warning section in Embodiment 3.

When this happens, the replay control mode judging unit 111 judges that the replay point 1502 belongs to the fast forward warning section 1503, and notifies the warning unit 114 of it. As a result of this, the warning screen 1602 including a message "fast forward is not available" is displayed as a part of the image screen 1601 on the external monitor, as shown in FIG. 16.

Suppose further that despite the warning screen, the user continues the fast forward until the replay point 1502 reaches the fast forward prohibited section 1504.

When this happens, the replay control mode judging unit 111 judges that the replay point 1502 belongs to the fast forward prohibited section 1504. As a result of this, the image data replaying unit 112 reads image data from the recording medium 121 at the standard replay speed, and sends the read image data to the image outputting unit 113. The image outputting unit 113 outputs a mode selection screen to the external monitor so that the mode selection screen is displayed instead of the warning screen 1602, as a part of the image screen. The mode selection screen displayed in this example prohibits fast forward, as described earlier, and therefore is the same as the mode selection screen 501 shown in FIG. 5 except that it does not include the sign 508 representing fast forward. On the displayed mode selection screen, the user can select any replay mode other than fast forward.

As described above, by providing the fast forward prohibited section immediately before the recording point, it is possible to prevent the recording of image data onto the recording medium 121 from being intermingled with the reading of image data from the recording medium 121.

Now, the operation of the present embodiment will be described with reference to the flowcharts shown in FIGS. 17 and 18.

Figure 17:
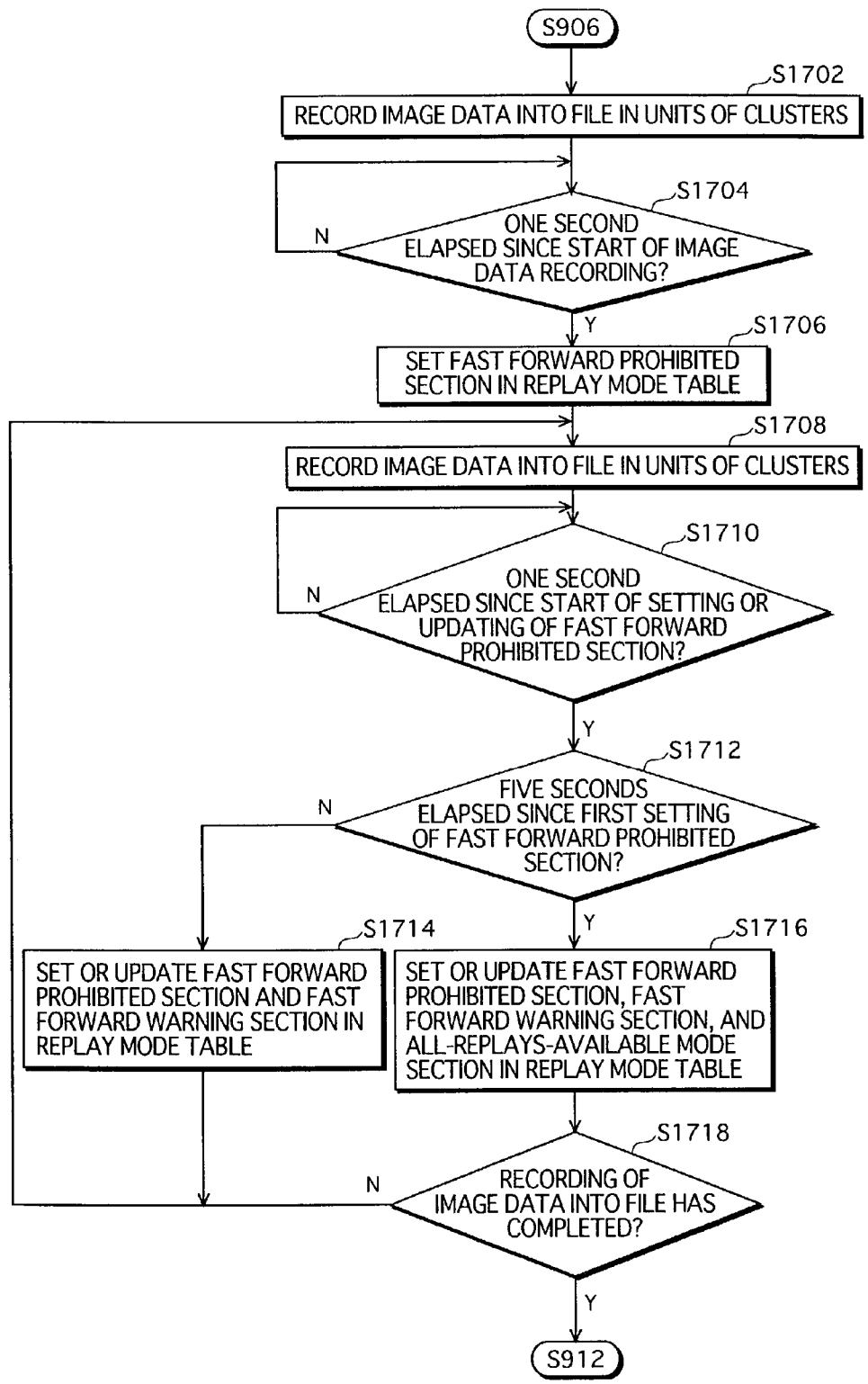
FIG. 17 is a flowchart showing a procedure in Embodiment 3.
Figure 18:
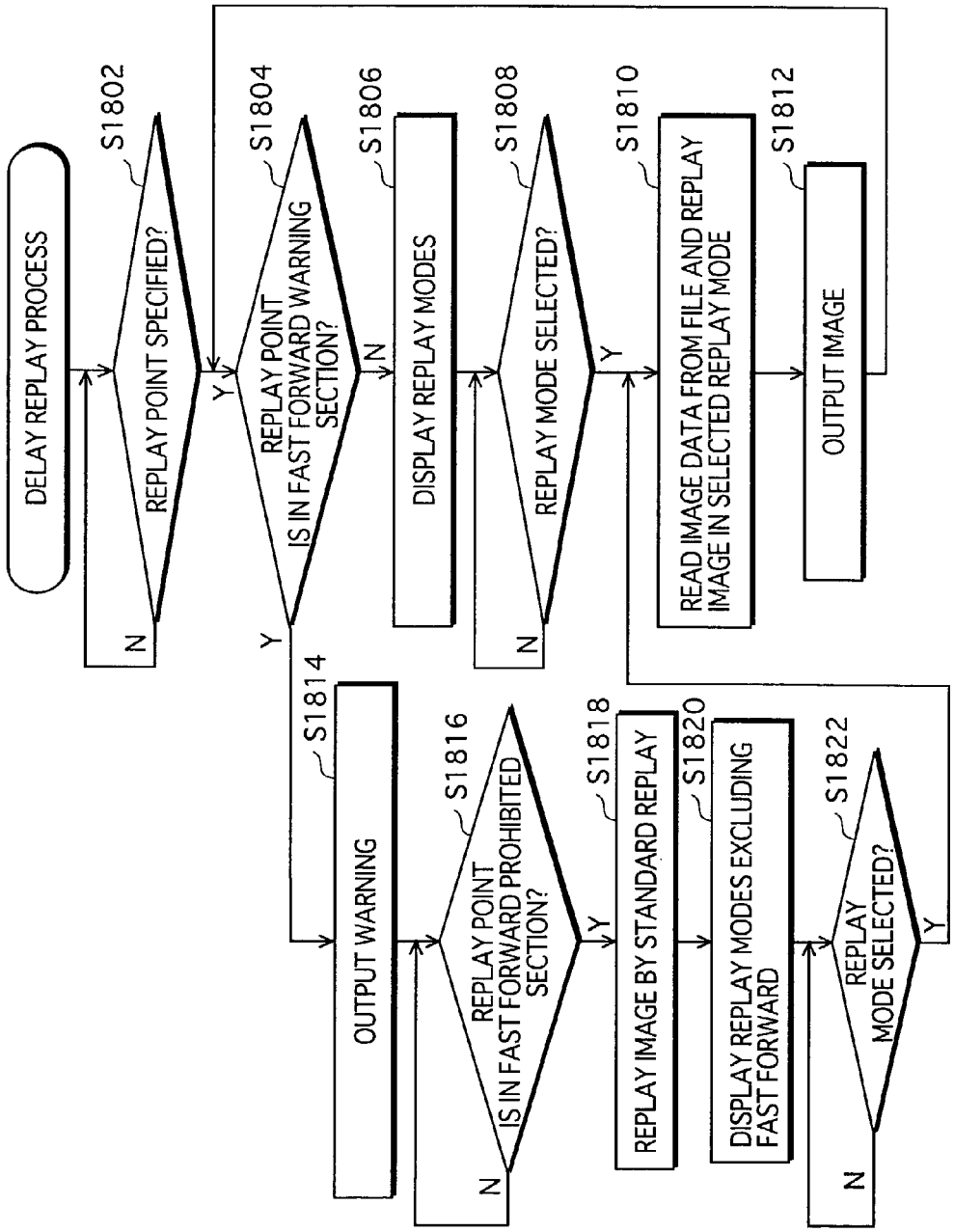
FIG. 18 is a flowchart showing a procedure in Embodiment 3.

FIG. 17 is a flowchart showing the procedure of setting the fast forward prohibited section and the fast forward warning section. Note that the steps before S1702 and after S1718 are the same as the steps S901 to S906 and the steps S912 to S918 shown in FIG. 9, and the overlapping steps are not described here.

The image data recording unit 106 records the image data received by the image data receiving unit 105 into a file in units of clusters (S1702).

The replay control mode setting unit 107 waits for 1 second to elapse since the start of the image data recording (S1704), then sets the fast forward prohibited section with the addresses in the replay mode table 1300 (S1706).

The image data recording unit 106 records the image data received by the image data receiving unit 105 into a file in units of clusters (S1708).

The replay control mode setting unit 107 waits for 1 second to elapse since the start of the setting or updating of the fast forward prohibited section (S1710), then judges whether 5 seconds have elapsed since the first setting of the fast forward prohibited section (S1712).

When the replay control mode setting unit 107 judges that 5 seconds have not elapsed yet, the replay control mode setting unit 107 sets or updates the fast forward prohibited section and the fast forward warning section with the addresses in the replay mode table 1300 (S1714), and returns to S1708. When the replay control mode setting unit 107 judges that 5 seconds have elapsed, the replay control mode setting unit 107 sets or updates the fast forward prohibited section, the fast forward warning section, and the all-replays-available mode section with the addresses in the replay mode table 1300 (S1716).

The image data recording unit 106 judges whether the recording of image data into the file has completed (S1718) If it has completed, the control returns to S912; and if it has not completed, the control returns to S1708.

Now, the operation of the delay replay in the present embodiment will be described with reference to the flowchart shown in FIG. 18.

First, the user interface processing unit 102 waits for a replay point to be specified by the user (S1802). If it is specified, the control moves to S1804 in which the replay point is sent to the replay control mode judging unit 111, and the replay control mode judging unit 111 judges whether the replay point belongs to the fast forward warning section (S1804). If it is judged negatively, the control moves to S1806 in which a mode selection screen is displayed (S1806), then selection of a replay mode by the user is waited (S1808).

If a replay mode is selected, the control moves to S1810 in which the image data replaying unit 112 reads image data from a file in the external recording medium 121 starting from the replay point, and replays the image in the selected replay mode (S1810).

The image outputting unit 113 outputs the image to the external monitor (S1812), and returns to S1804.

If it is judged in S1804 that the replay point belongs to the fast forward warning section, the warning unit 114 outputs a warning voice and a warning screen including a message that fast forward is not available, as a part of the image screen (S1814).

Then the replay control mode judging unit 111 waits for the replay point enters the fast forward prohibited section (S1816).

If the replay point enters the fast forward prohibited section, the image data replay unit 112 reads image data from the file in the recording medium 121 at the standard replay speed, starting with the replay point of the currently replayed image data (S1818).

Then, the replay control mode judging unit 111 instructs the image outputting unit to display the replay modes excluding fast forward (S1820), waits for a selection of a replay mode by the user (S1822), and if a replay mode is selected, returns to S1810.

It should be noted here that although in the present embodiment, a section corresponding to a time period of approximately 1 second before a recording point is regarded as the fast forward prohibited section, the time period is not limited to 1 second, but maybe 1 minute, for example. Similarly, although in the present embodiment, a section corresponding to a time period of approximately 4 seconds before the fast forward prohibited section is regarded as the fast forward warning section, the time period is not limited to 4 seconds, but may be 4 minutes, for example.

The present embodiment is described using a case where image data is recorded in the files each of which corresponds to a predetermined time period in size. However, off course, the present embodiment can be applied to a case of Embodiment 2 where image data is sequentially recorded in one file.

In the above embodiments, the user specifies a repeat recording time period. However, a broadcast program may be programmed beforehand to, if the user specifies the broadcast program for the repeat recording, specify a repeat recording time period that is shorter than the total length of the broadcast program. This arrangement achieves both (a) the protection of the contents of the broadcast program by prohibiting the whole program from being recorded, and (b) the delay replay in which the user can watch a scene he/she missed.

Basically, the above embodiments have the construction shown in FIG. 2. However, the functions of each component may be achieved by a computer program that causes a computer to perform the functions. Further, the computer program may be recorded in a computer-readable recording medium, and the computer-readable recording medium maybe used in a conventional image recording and replaying apparatus so as to achieve the delay replay provided by the present invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image recording and replaying apparatus that records image data onto a recording medium allowing a user to replay the recorded image data while continuing the recording, the image recording and replaying apparatus comprising:
    an image recording means for recording image data onto the recording medium;
    a replay means for replaying recorded image data in a replay mode selected from a plurality of replay modes;
    a judging means for judging, based on a relationship between a current recording point and a current replay point, whether the plurality of replay modes from which one is selected for the replay by the replay means should be limited to one or more replay modes; and
    a replay control means for, if the judging means judges that the plurality of replay modes should be limited to the one or more replay modes, instructing the replay means to replay the image data in one of the one or more replay modes.

2. The image recording and replaying apparatus of claim 1, wherein
the judging means includes:
a data-recorded-area dividing unit for dividing a data-recorded-area in the recording medium into two or more sections according to a recording time difference between each section and the current recording point, each section corresponding to a different combination of replay modes; and
a judging unit for detecting a section containing the current replay point, and judging, based on the detected section, whether the plurality of replay modes from which one is selected should be limited to the one or more replay modes.

3. The image recording and replaying apparatus of claim 2, wherein
the image recording means includes
a first image recording unit for recording image data into files each of which has a capacity that corresponds to a predetermined replay time period,
the data-recorded-area dividing unit includes
a file classifying unit for classifying the files into which the image data has been recorded by the first image recording unit, into (a) a first group corresponding to a specified recording time period having a length up to the current recording point, (b) a second group corresponding to a predetermined time period immediately before the specified recording time period, and (c) a third group corresponding to a time period immediately before the predetermined time period, and
the judging unit includes
a file judging unit for judging whether the current replay point exists in a file belonging to the second group, wherein
when the file judging unit judges that the current replay point exists in a file belonging to the second group, the replay control means instructs the replay means to replay the image data in either fast forward or a standard replay.

4. The image recording and replaying apparatus of claim 3 further comprising
a deleting means for deleting files classified as belonging to the third group by the file classifying unit.

5. The image recording and replaying apparatus of claim 4 further comprising
an instruction receiving means for receiving an instruction to replay files belonging to the first group, wherein
when the instruction receiving means receives an instruction to replay files belonging to the first group, the replay means reads image data from the files belonging to the first group and replays the read image data in either the standard replay or a special replay, and
the image recording and replaying apparatus further comprising
a warning means for, when the replay means is to read image data from a file belonging to the second group, outputting a warning that special replays other than fast forward are not available.

6. The image recording and replaying apparatus of claim 5, wherein
the warning means includes
a mode receiving unit for displaying a plurality of available replay modes on an external monitor and waiting for notification by a user of one selected from the displayed replay modes, wherein the replay means reads image data from the files belonging to the second group and replays the read image data in the user-selected replay mode received by the mode receiving unit.

7. The image recording and replaying apparatus of claim 5, wherein
the warning means outputs to an external speaker a warning voice that special replays other than the fast forward are not available.

8. The image recording and replaying apparatus of claim 6, wherein
when the mode receiving unit does not receive notification by the user of a replay mode in a predetermined duration, the replay means reads image data from the file belonging to the second group and replays the read image data in a default replay mode.

9. The image recording and replaying apparatus of claim 8, wherein
the default replay mode is the standard replay.

10. The image recording and replaying apparatus of claim 8, wherein
the default replay mode is the fast forward performed at such a speed as image data is read from the file belonging to the second group and replayed before the file belonging to the second group is classified as the third group and then deleted.

11. The image recording and replaying apparatus of claim 2, wherein
the image recording means includes
a second image recording unit for recording image data into a file which has a capacity that corresponds to a length in time composed of a specified recording time period and double a predetermined time period,
the data-recorded-area dividing unit includes
an area classifying unit for classifying a recording area in the file into which the image data has been recorded by the second image recording unit, into (a) a first area section corresponding to the specified recording time period having a length up to the current recording point, (b) a second area section corresponding to the predetermined time period immediately before the specified recording time period, and (c) a third area section corresponding to the predetermined time period immediately before the second area section,
the judging unit includes
an area section judging unit for judging whether the current replay point exists in the second area section, wherein
when the file judging unit judges that the current replay point exists in the second area section, the replay control means instructs the replay means to replay the image data in either fast forward or a standard replay.

12. The image recording and replaying apparatus of claim 11, wherein
after the second image recording unit has recorded image data into an entire area of the file, the second image recording unit then records image data into the file by overwriting earliest recorded image data in the third area section with most recent image data.

13. The image recording and replaying apparatus of claim 12 further comprising:
an instruction receiving means for receiving an instruction to replay image data recorded in the first area section, wherein
when the instruction receiving means receives an instruction to replay image data recorded in the first area section, the replay means reads image data from the first area section and replays the read image data in either the standard replay or a special replay, and the image recording and replaying apparatus further comprising a warning means for, when the replay means is to read image data recorded in the second area section, outputting a warning that special replays other than fast forward are not available.

14. The image recording and replaying apparatus of claim 13, wherein the warning means includes a mode receiving unit for displaying a plurality of available replay modes on an external monitor and waiting for notification by a user of one selected from the displayed replay modes, wherein the replay means reads image data from the second area section and replays the read image data in the user-selected replay mode received by the mode receiving unit.

15. The image recording and replaying apparatus of claim 14, wherein when the mode receiving unit does not receive notification by the user of a replay mode within a predetermined duration, the replay means reads image data from the second area section and replays the read image data in a default replay mode.

16. The image recording and replaying apparatus of claim 15, wherein the default replay mode is the standard replay.

17. The image recording and replaying apparatus of claim 15, wherein the default replay mode is the fast forward performed at such a speed as image data is read from the second area section and replayed before the image data in the second area section is overwritten with most recent image data.

18. The image recording and replaying apparatus of claim 13, wherein the warning means outputs to an external speaker a warning voice that special replays other than the fast forward are not available.

19. The image recording and replaying apparatus of claim 2, wherein the image recording means includes:

a receiving unit for receiving image data; and a third image recording unit for recording the received image data onto the recording medium in units of clusters each of which has a predetermined size, the data-recorded-area dividing unit includes a first classifying unit for classifying a recording area in the recording medium into which the image data has been recorded by the third image recording unit, into (a) a specific-replay-mode-prohibited section in which most recently received image data making up a portion of a first cluster is recorded and the image data recorded in the specific-replay-mode-prohibited section is prohibited from being replayed in a specific replay mode, and (b) an all-replays-available section in which the remaining image data of the first cluster and the other recorded clusters is recorded and the image data recorded in the all-replays-available section can be replayed in any replay mode, and the judging unit includes a first judging unit for judging whether the current replay point exists in the specific-replay-mode-prohibited section, wherein when the first judging unit judges that the current replay point exists in the specific-replay-mode-prohibited section, the replay control means instructs the replay means to replay the image data in a standard replay.

20. The image recording and replaying apparatus of claim 19, wherein the data-recorded-area dividing unit further includes a second classifying unit for classifying the recording area further into a specific-replay-mode-warning section to which a certain number of cluster immediately before the specific-replay-mode-prohibited section belong, the judging unit includes a second judging unit for judging whether the current replay point exists in the specific-replay-mode-warning section, and the image recording and replaying apparatus further comprises a warning means for, when the second judging unit judges that the current replay point exists in the specific-replay-mode-warning section, outputting a warning that fast forward is not available.

21. An image recording and replaying method that records image data onto a recording medium allowing a user to replay the recorded image data while continuing the recording, the image recording and replaying method comprising:

an image recording step for recording image data onto the recording medium;

a replay step for replaying recorded image data in a replay mode selected from a plurality of replay modes;

a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

22. A program that causes a computer to execute an image recording and replaying method that records image data onto a recording medium allowing a user to replay the recorded image data while continuing the recording, the program comprising:

an image recording step for recording image data onto the recording medium;

a replay step for replaying recorded image data in a replay mode selected from a plurality of replay modes;

a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

23. A computer-readable recording medium recording a program that causes a computer to execute an image recording and replaying method that records image data onto a first recording medium allowing a user to replay the recorded image data while continuing the recording, the program comprising:

an image recording step for recording image data onto the first recording medium;

a replay step for replaying recorded image data in a replay mode selected from a plurality of replay modes;

a judging step for judging, based on a relationship between a current recording point and a current replay point, whether the plurality of replay modes from which one is selected for the replay in the replay step should be limited to one or more replay modes; and a replay control step for, if the judging step judges that the plurality of replay modes should be limited to the one or more replay modes, instructing the replay step to replay the image data in one of the one or more replay modes.

* * * * *